US012627440B2

(12) United States Patent
Abdelghaffar et al.

(10) Patent No.: US 12,627,440 B2
(45) Date of Patent: May 12, 2026

(54) SYSTEM AND METHOD FOR MAPPING SOUNDING REFERENCE SIGNALS TO RESOURCES

(71) Applicant: QUALCOMM Incorporated, San Diego, CA (US)

(72) Inventors: Muhammad Sayed Khairy Abdelghaffar, San Jose, CA (US); Chenxi Hao, Beijing (CN); Yu Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/041,987

(22) PCT Filed: Oct. 23, 2020

(86) PCT No.: PCT/CN2020/123217

§ 371 (c)(1),
(2) Date: Feb. 16, 2023

(87) PCT Pub. No.: WO2022/082721

PCT Pub. Date: Apr. 28, 2022

(65) Prior Publication Data

US 2024/0031099 A1    Jan. 25, 2024

(51) Int. Cl.
*H04W 4/00* (2018.01)
*H04L 5/00* (2006.01)
(Continued)

(52) U.S. Cl.
CPC .......... *H04L 5/0051* (2013.01); *H04L 5/0012* (2013.01); *H04W 72/02* (2013.01);
(Continued)

(58) Field of Classification Search
None
See application file for complete search history.

(56) References Cited

U.S. PATENT DOCUMENTS

2018/0205440 A1*  7/2018  Enescu ................ H04B 7/0417
2020/0028638 A1   1/2020  Liu et al.
(Continued)

FOREIGN PATENT DOCUMENTS

CN        107925999 A      4/2018
CN        110710281 A      1/2020
(Continued)

OTHER PUBLICATIONS

Supplementary European Search Report—EP20958303—Search Authority—The Hague—Jul. 11, 2024.
(Continued)

*Primary Examiner* — Zewdu A Beyen
(74) *Attorney, Agent, or Firm* — QUALCOMM Incorporated

(57) ABSTRACT

A user equipment (UE) may receive, from a base station, a sounding reference signal (SRS) configuration indicating at least two resource allocations for each SRS resource of an SRS resource set, and each of the at least two resource allocations may include a time resource allocation and a frequency resource allocation. The UE may further transmit, to the base station, an SRS on a respective SRS resource of the SRS resource set based on one of the at least two resource allocations for the respective SRS resource. The base station may transmit, to the UE, the SRS configuration indicating at least two resource allocations for each SRS resource of an SRS resource set, and receive, from the UE, the SRS on a respective SRS resource of the SRS resource set based on the one of the at least two resource allocations for the respective SRS resource.

64 Claims, 12 Drawing Sheets

(51) Int. Cl.

| | | |
|---|---|---|
| *H04W 72/02* | (2009.01) | |
| *H04W 72/0446* | (2023.01) | |
| *H04W 72/0453* | (2023.01) | |
| *H04W 72/121* | (2023.01) | |
| *H04W 72/232* | (2023.01) | |

(52) U.S. Cl.

CPC ... *H04W 72/0446* (2013.01); *H04W 72/0453* (2013.01); *H04W 72/121* (2013.01); *H04W 72/232* (2023.01)

(56) References Cited

U.S. PATENT DOCUMENTS

| | | | |
|---|---|---|---|
| 2020/0036492 A1 | 1/2020 | Sun et al. | |
| 2022/0110109 A1 | 4/2022 | Tsai et al. | |
| 2023/0239843 A1* | 7/2023 | Liu | H04L 5/0096 |
| | | | 370/329 |

FOREIGN PATENT DOCUMENTS

| | | | | |
|---|---|---|---|---|
| WO | 2020039334 A1 | 2/2020 | | |
| WO | 2020144278 A1 | 7/2020 | | |
| WO | WO-2021258088 A2 * | 12/2021 | .......... | H04L 5/0051 |

OTHER PUBLICATIONS

Intel Corporation, et al., "Summary of Remaining Issues for NR Positioning", 3GPP Draft, 3GPP TSG RAN WG1 Meeting #102-E, R1-200zzzz, e-meeting Aug. 17-28, 2020, 21 Pages, section 6.2.1.

International Search Report and Written Opinion—PCT/CN2020/123217—ISA/EPO—Jul. 14, 2021.

Moderator (Ericsson): "Feature Lead Summary for Maintenance of UL SRS and L1 Procedures for NR Positioning", 3GPP Draft, 3GPP TSG-RAN WG1 Meeting #102e, Draft R1-20xxxxx, e-meeting Aug. 17 -28, 2020, pp. 1-11, section 6.2.1.

* cited by examiner

SRS configuration indicating at least two resource allocations for each SRS resource of an SRS resource set – each of the at least two resource allocations including a time resource allocation and a frequency resource

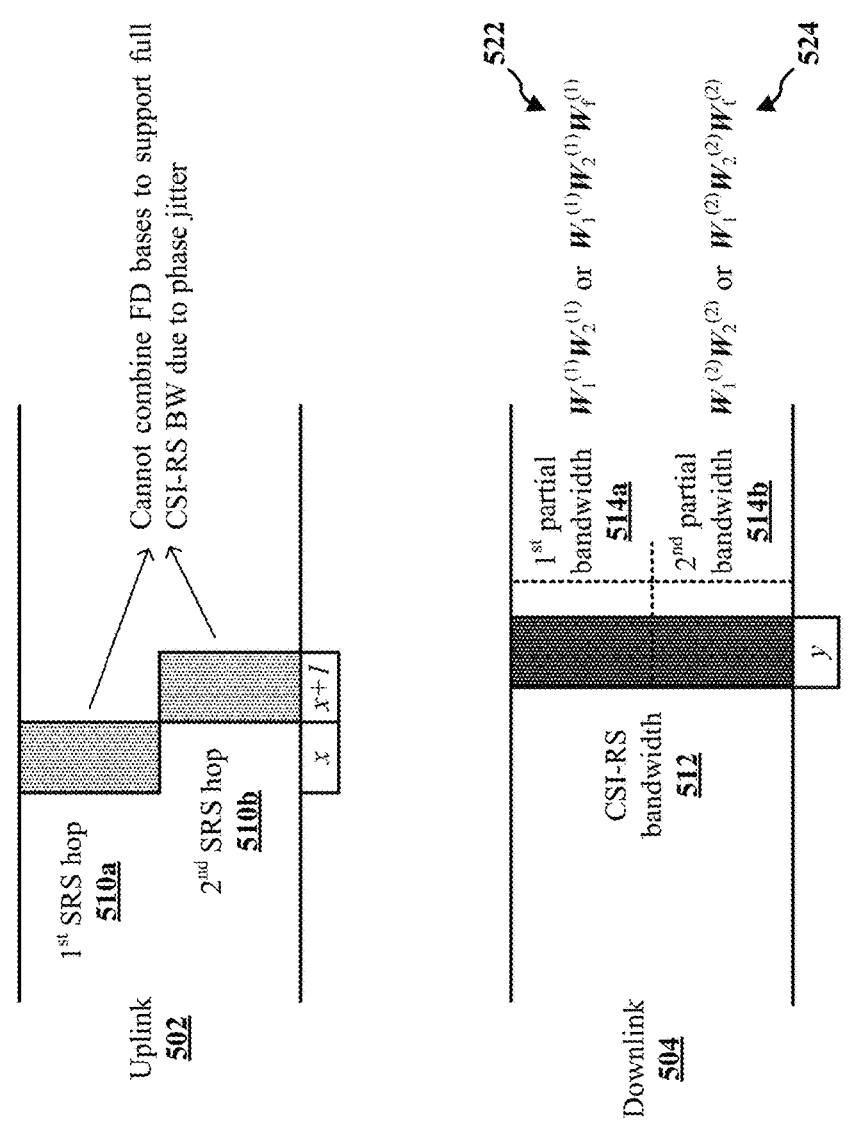
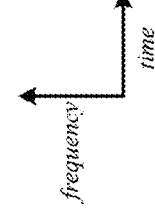
FIG. 5

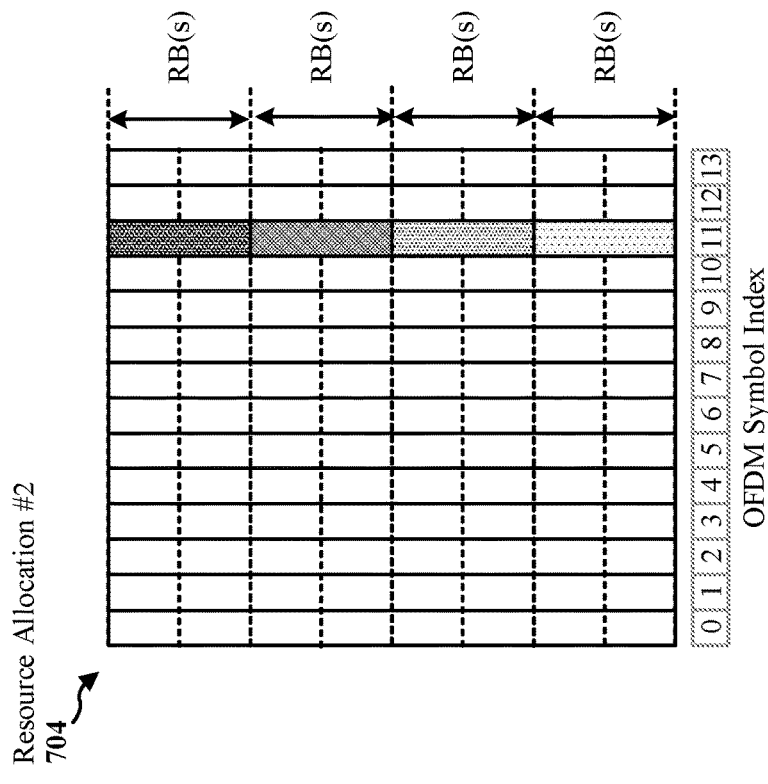
Resource Allocation #2
704
OFDM Symbol Index
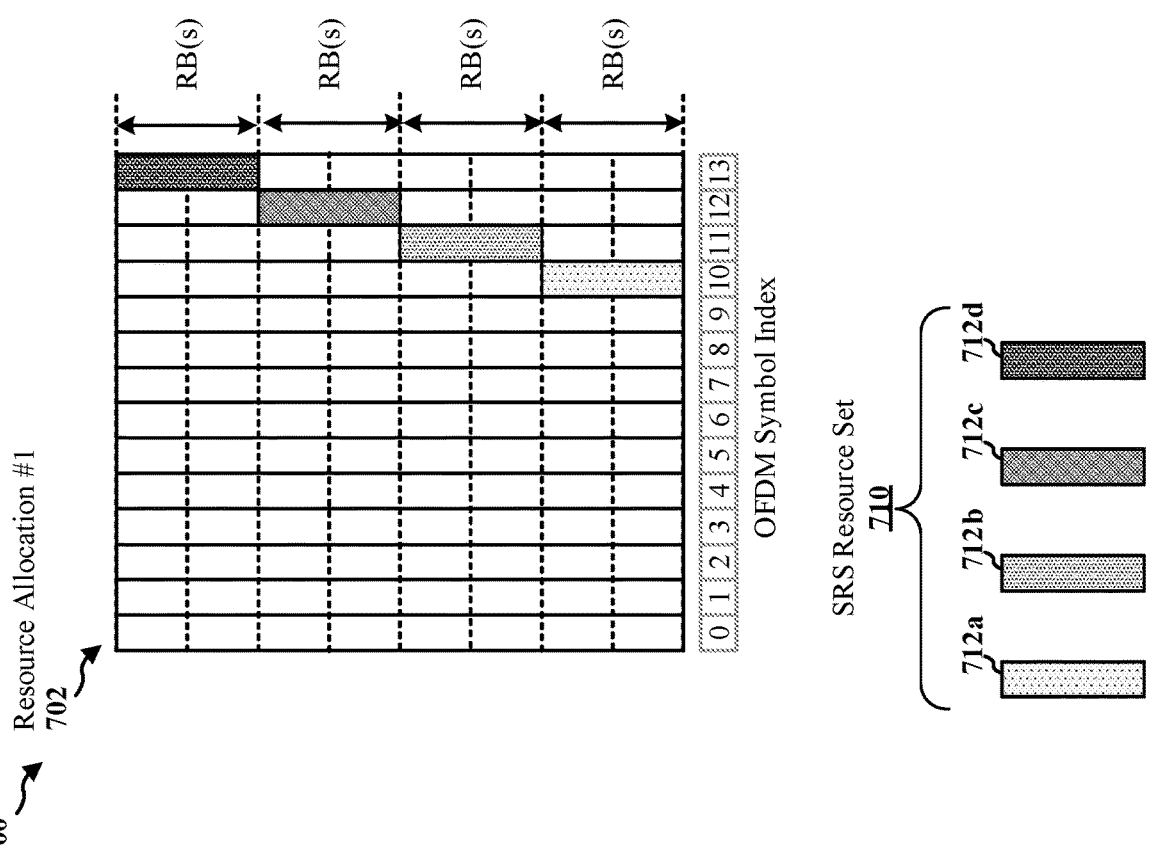
Resource Allocation #1
702
OFDM Symbol Index
700
SRS Resource Set
710
712a  712b  712c  712d
FIG. 7

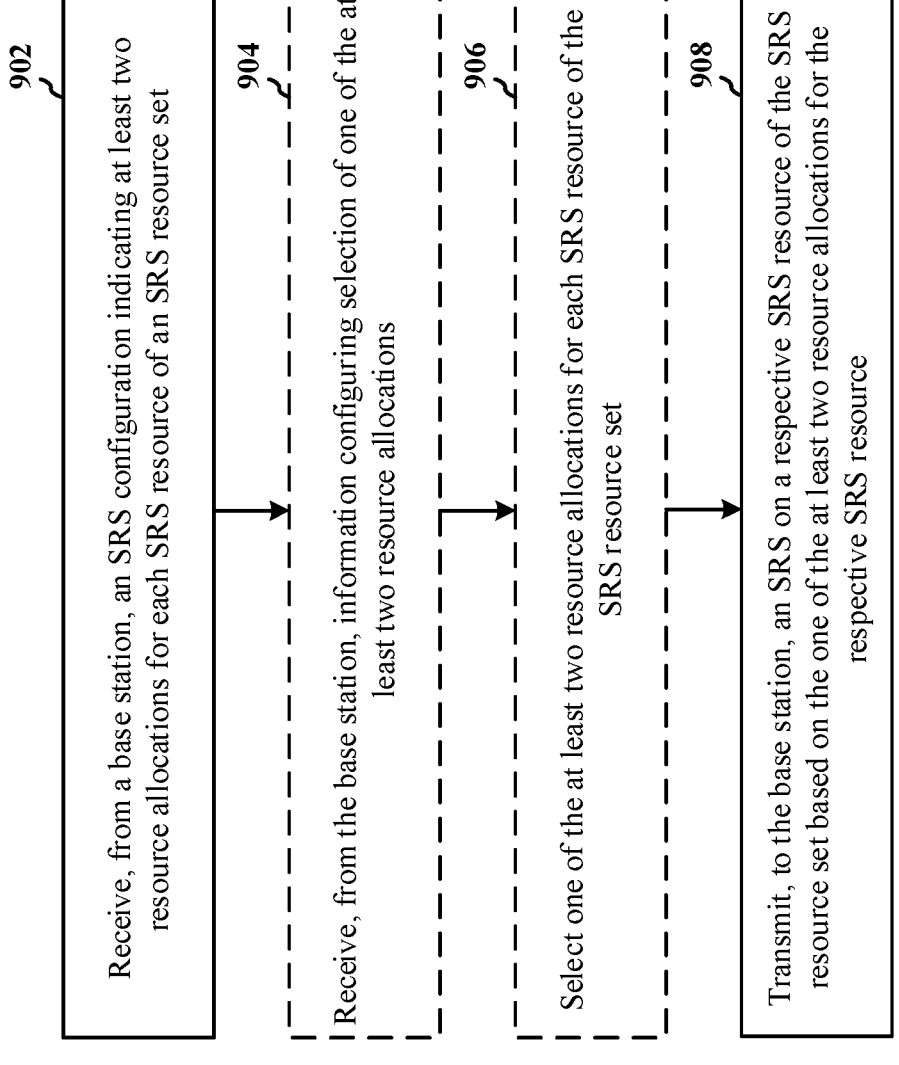

902 Receive, from a base station, an SRS configuration indicating at least two resource allocations for each SRS resource of an SRS resource set 904 Receive, from the base station, information configuring selection of one of the at least two resource allocations 906 Select one of the at least two resource allocations for each SRS resource of the SRS resource set 908 Transmit, to the base station, an SRS on a respective SRS resource of the SRS resource set based on the one of the at least two resource allocations for the respective SRS resource

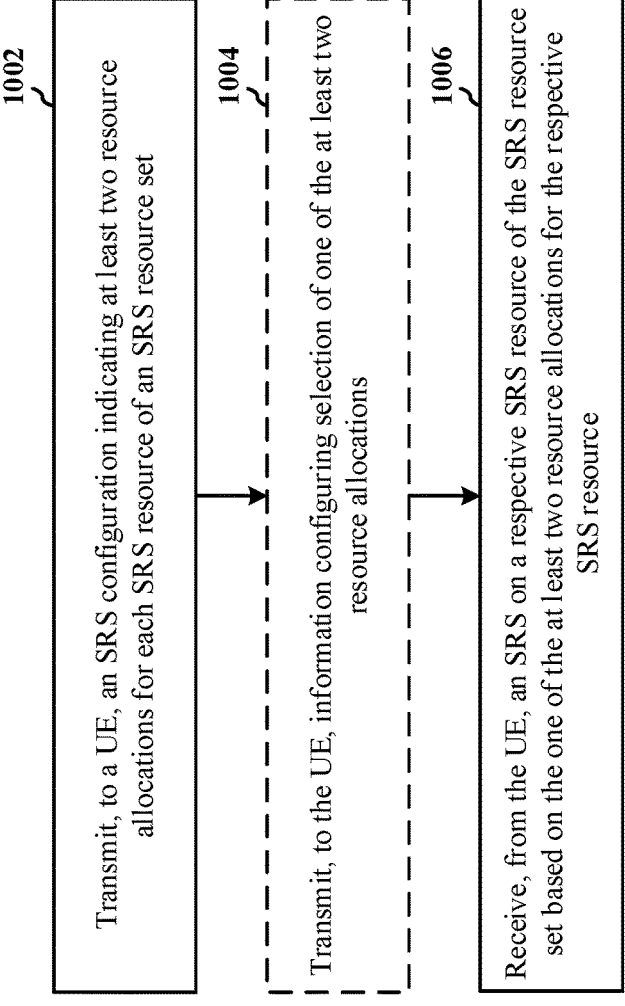

Transmit, to a UE, an SRS configuration indicating at least two resource allocations for each SRS resource of an SRS resource set

1002

Transmit, to the UE, information configuring selection of one of the at least two resource allocations

1004

Receive, from the UE, an SRS on a respective SRS resource of the SRS resource set based on the one of the at least two resource allocations for the respective SRS resource

1006

SYSTEM AND METHOD FOR MAPPING SOUNDING REFERENCE SIGNALS TO RESOURCES

CROSS REFERENCE TO RELATED APPLICATION(S)

This application is a National Phase entry of PCT Application No. PCT/CN2020/123217, entitled "SYSTEM AND METHOD FOR MAPPING SOUNDING REFERENCE SIGNALS TO RESOURCES" and filed on Oct. 23, 2020, which is expressly incorporated by reference herein in its entirety.

BACKGROUND

Technical Field

The present disclosure generally relates to communication systems, and more particularly, to a user equipment configured to transmit sounding reference signals to a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In access networks of some example radio access technologies (RATs), such as a 5G New Radio (NR) access network, a base station may estimate at least one channel on which transmissions are received from a user equipment (UE) (e.g., an uplink channel) using at least one sounding reference signal (SRS). Additionally or alternatively, SRS can be used for uplink frequency selective scheduling and/or uplink timing estimation.

Accordingly, the UE transmits the at least one SRS to the base station. In so doing, the UE may sound all ports of an SRS resource in each symbol of the SRS resource. In some aspects, the UE may aperiodically transmit SRSs to the base station, with such aperiodic SRS transmission being triggered by the base station, for example, via downlink or uplink downlink control information (DCI) (e.g., SRS request field).

For frequency-division duplexing (FDD) (e.g., paired spectrum), the base station may utilize SRS to derive frequency domain-spatial domain (FD-SD) bases for precoding of channel state information (CSI) reference signals (RSs). However, if SRS is sounded per band, such as with SRS frequency hopping, the base station may be unable to combine FD bases determined via SRS measurement. Similarly, in time-division duplexing (TDD), the base station may be unable to perform joint processing (e.g., noise filtering) using the channel impulse response (CIR) of two or more subbands.

Thus, a need exists for facilitating derivation of FD bases determined via SRS measurement by a base station. The present disclosure provides various techniques and solutions to the derivation of FD bases determined via SRS measurement by a base station. In particular, the present disclosure describes configuring a UE with two SRS resource allocations for each SRS resource of an SRS resource set, with each resource allocation including a resource allocation for both time and frequency. A first resource allocation of the at least two resource allocations may be based on subband sounding, and therefore, may include frequency hopping in the frequency resource allocation. Further, a second resource allocation of the at least two resource allocations may be based on wideband sounding, and therefore, may exclude frequency hopping in the frequency resource allocation.

In some further aspects, the present disclosure describes the at least two resource allocations having different frequency comb configurations in respective frequency resource allocations. The difference between frequency comb configurations of the frequency resource allocations of the at least two resource allocations may increase SRS capacity, such as when the base station configures a relatively larger comb size for wideband sounding.

In an aspect of the disclosure, a method, a computer-readable medium, and an apparatus are provided. The apparatus may be a UE. The apparatus may be configured to receive, from a base station, an SRS configuration indicating at least two resource allocations for each SRS resource of an SRS resource set. Each of the at least two resource allocations may include at least one of a time resource allocation and/or a frequency resource allocation. The apparatus may be further configured to transmit, to the base station, an SRS on a respective SRS resource of the SRS resource set based on one of the at least two resource allocations for the respective SRS resource.

In another aspect of the disclosure, another method, another computer-readable medium, and another apparatus are provided. The other apparatus may be a base station. The apparatus may be configured to transmit, to a UE, an SRS configuration indicating at least two resource allocations for each SRS resource of an SRS resource set. Each of the at least two resource allocations may include at least one of a time resource allocation and/or a frequency resource allocation. The apparatus may be further configured to receive, from the UE, an SRS on a respective SRS resource of the SRS resource set based on one of the at least two resource allocations for the respective SRS resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating example SRS transmissions according to SRS resource allocations.

FIG. 7 is a diagram illustrating example resource allocations for SRS transmission.

FIG. 9 is a flowchart of a method of wireless communication by a UE.

FIG. 10 is a flowchart of a method of wireless communication by a base station.

DETAILED DESCRIPTION

Figure 1:
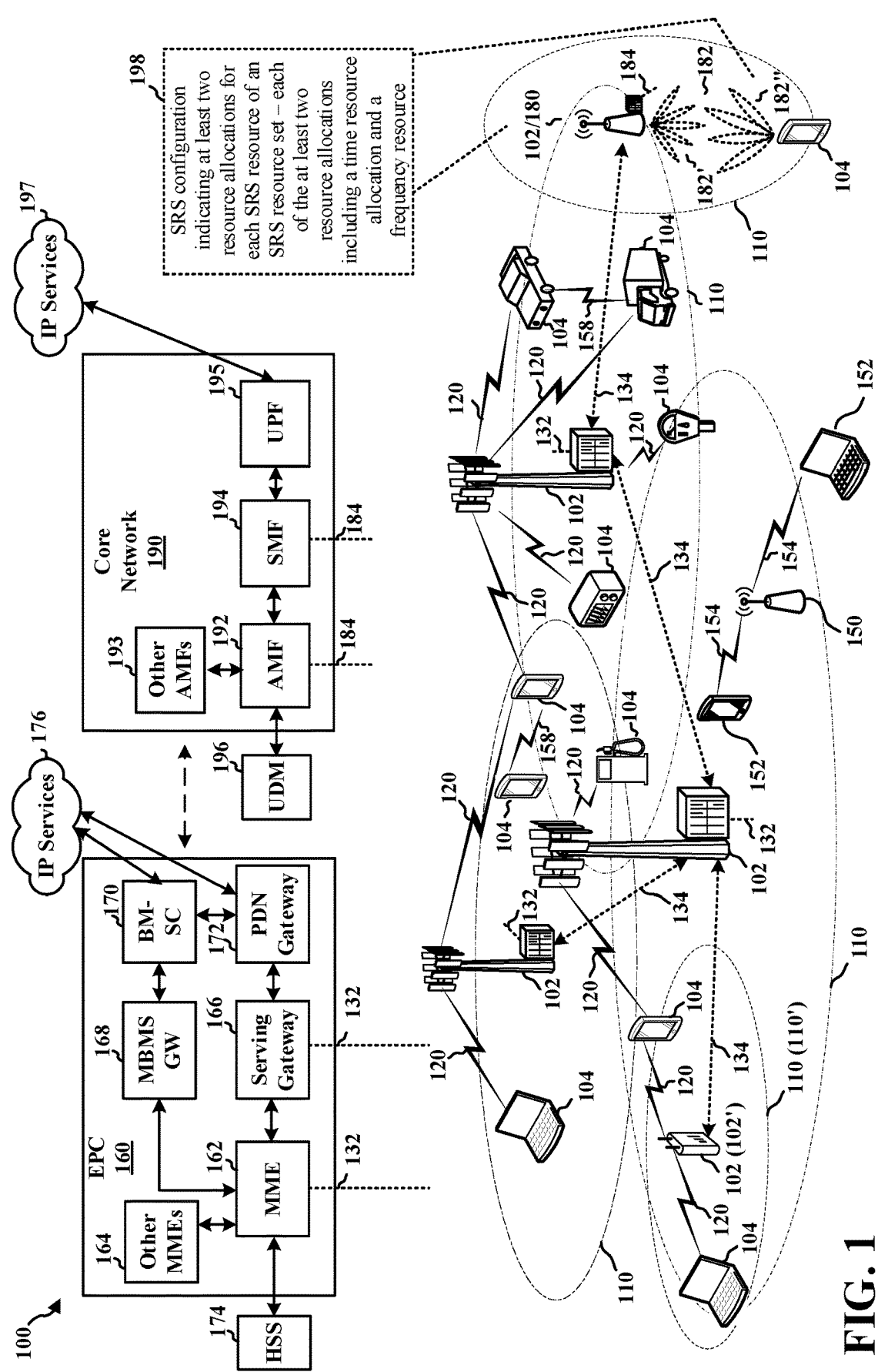
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may be configured to transmit, to the UE 104, a sounding reference signal (SRS) configuration 198 that indicates at least two resource allocations for each SRS resource of an SRS resource set. Each of the at least two resource allocations may include a time resource allocation and/or a frequency resource allocation.

Correspondingly, the UE 104 may be configured to receive, from the base station 102/180, the SRS configuration 198 that indicates the at least two resource allocations for each SRS resource of the SRS resource set, and each of the at least two resource allocations may include the time resource allocation and/or the frequency resource allocation. In some aspects, the UE 104 may be configured to determine (e.g., select) one resource allocation of the at least two resource allocations.

The UE 104 may be further configured to then transmit, to the base station 102/180, an SRS on a respective SRS resource of the SRS resource set based on the (selected) one of the at least two resource allocations for the respective SRS resource. Thus, the base station 102/180 may be further configured to receive, from the UE 104, an SRS on a respective SRS resource of the SRS resource set based on one of the at least two resource allocations for the respective SRS resource.

Various aspects and other details related to SRS transmissions by UEs to base stations based on dynamic selections of resource allocations are further described herein.

Figures 2A, 2B, 2C, 2D:
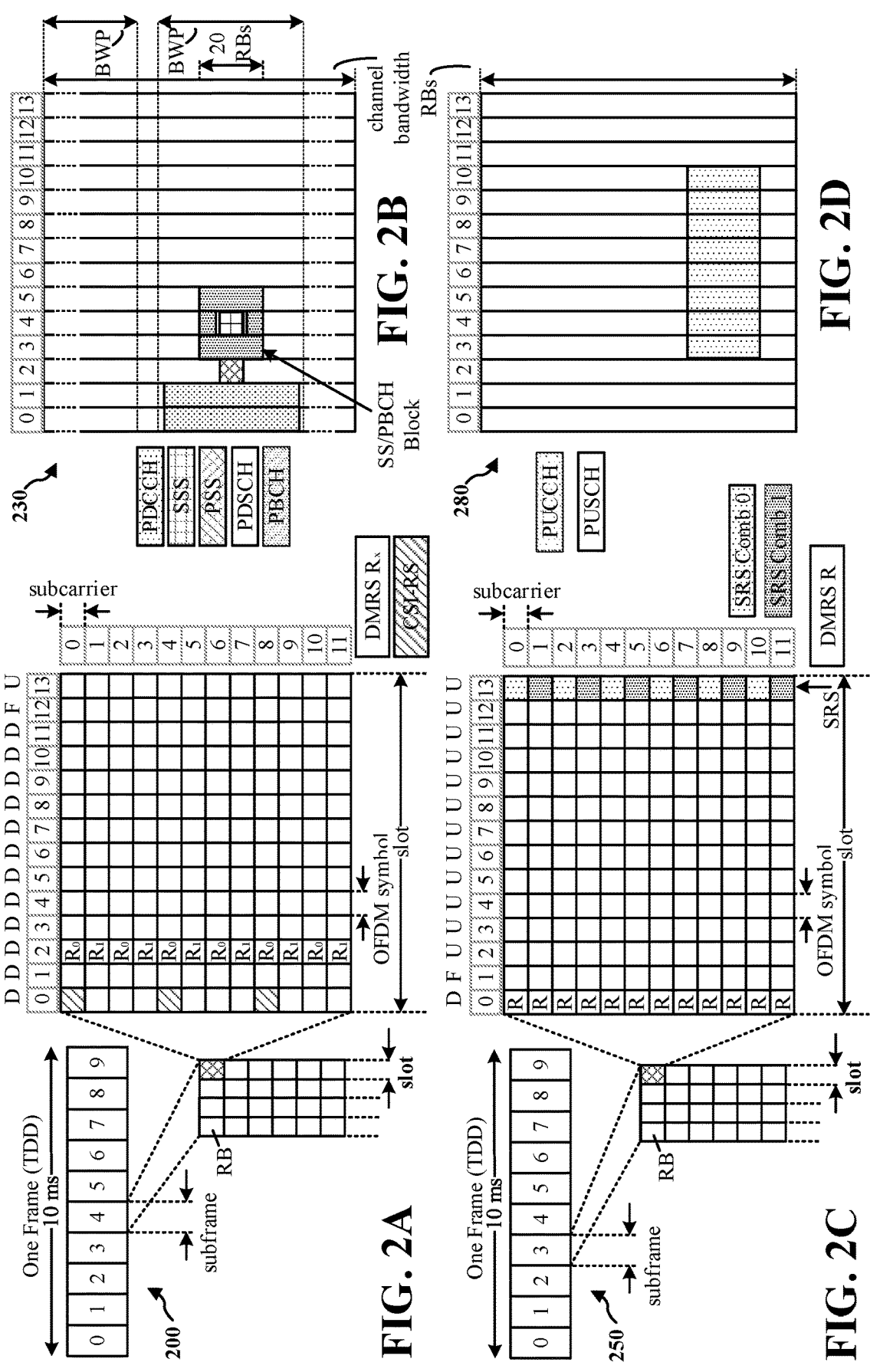
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD. Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\rho$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
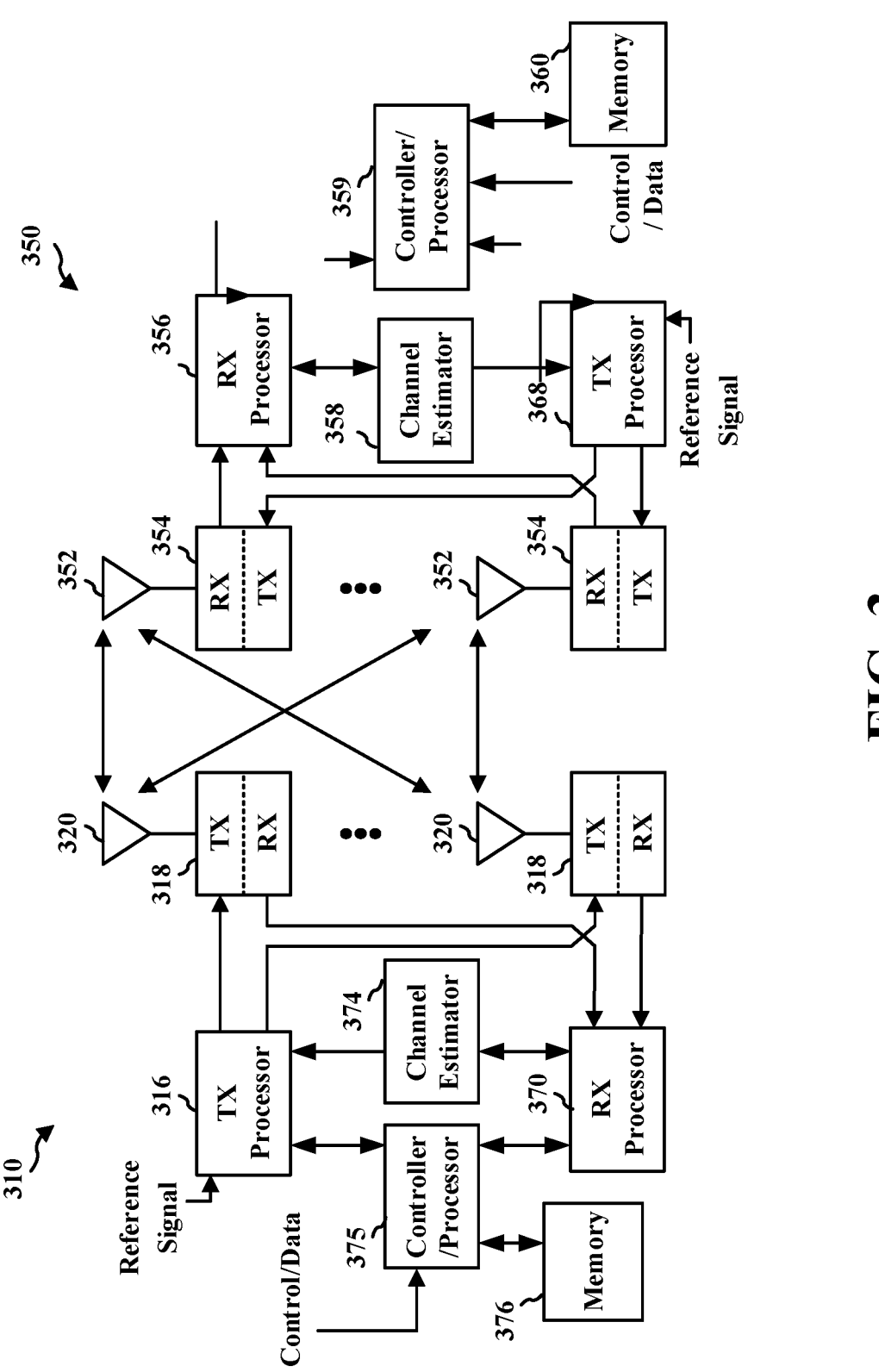
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the SRS configuration 198 of FIG. 1.

In some other aspects, at least one of the TX processor 316, the RX processor 370, and the controller/processor 375 may be configured to perform aspects in connection with the SRS configuration 198 of FIG. 1.

Referring now to FIGS. 4 through 12, various aspects and other details related to SRS transmissions by UEs to base stations based on dynamic selection of resource allocations are further described. In some RANs, including various 5G NR RANs, a base station (e.g., gNB) may estimate at least one channel on which transmissions are received from a UE (e.g., an uplink channel) using at least one SRS. Additionally or alternatively, SRS can be used for uplink frequency selective scheduling and/or uplink timing estimation.

Accordingly, the UE transmits the at least one SRS to the base station. In so doing, the UE may sound all ports of an SRS resource in each symbol of the SRS resource. In some aspects, the UE may aperiodically transmit SRSs to the base station, with such aperiodic SRS transmission being triggered by the base station, for example, via downlink or uplink DCI (e.g., SRS request field).

For FDD (e.g., paired spectrum), the base station may utilize SRS to derive frequency domain-spatial domain (FD-SD) bases for precoding of CSI-RSs. However, if SRS is sounded per band, such as with SRS frequency hopping, the base station may be unable to combine FD bases determined via SRS measurement. Similarly, in TDD, the base station may be unable to perform joint processing (e.g., noise filtering) using the channel impulse response (CIR) of two or more subbands.

Thus, a need exists for facilitating derivation of FD bases determined via SRS measurement by a base station. The present disclosure provides various techniques and solutions to the derivation of FD bases determined via SRS measurement by a base station. In particular, the present disclosure describes configuring a UE with two SRS resource allocations for each SRS resource of an SRS resource set, with each resource allocation including a resource allocation for both time and frequency. A first resource allocation of the at least two resource allocations may be based on subband sounding, and therefore, may include frequency hopping in the frequency resource allocation.

A second resource allocation of the at least two resource allocations, however, may be based on wideband sounding, and therefore, may exclude frequency hopping in the frequency resource allocation. Potentially, the base station may be able to combine FD bases determined via SRS measurement when the UE is configured to transmit SRS for wideband sounding. Thus, the UE may (dynamically) select the aforementioned second resource allocation, for wideband sounding over all ports. Such (dynamic) selection of a resource allocation may be configured for the UE by the base station, e.g., as further described herein.

In some further aspects, the present disclosure describes the at least two resource allocations having different frequency comb configurations in respective frequency resource allocations. The difference between frequency comb configurations of the frequency resource allocations of the at least two resource allocations may increase SRS capacity, such as when the base station configures a relatively larger comb size for wideband sounding.

Figure 4:
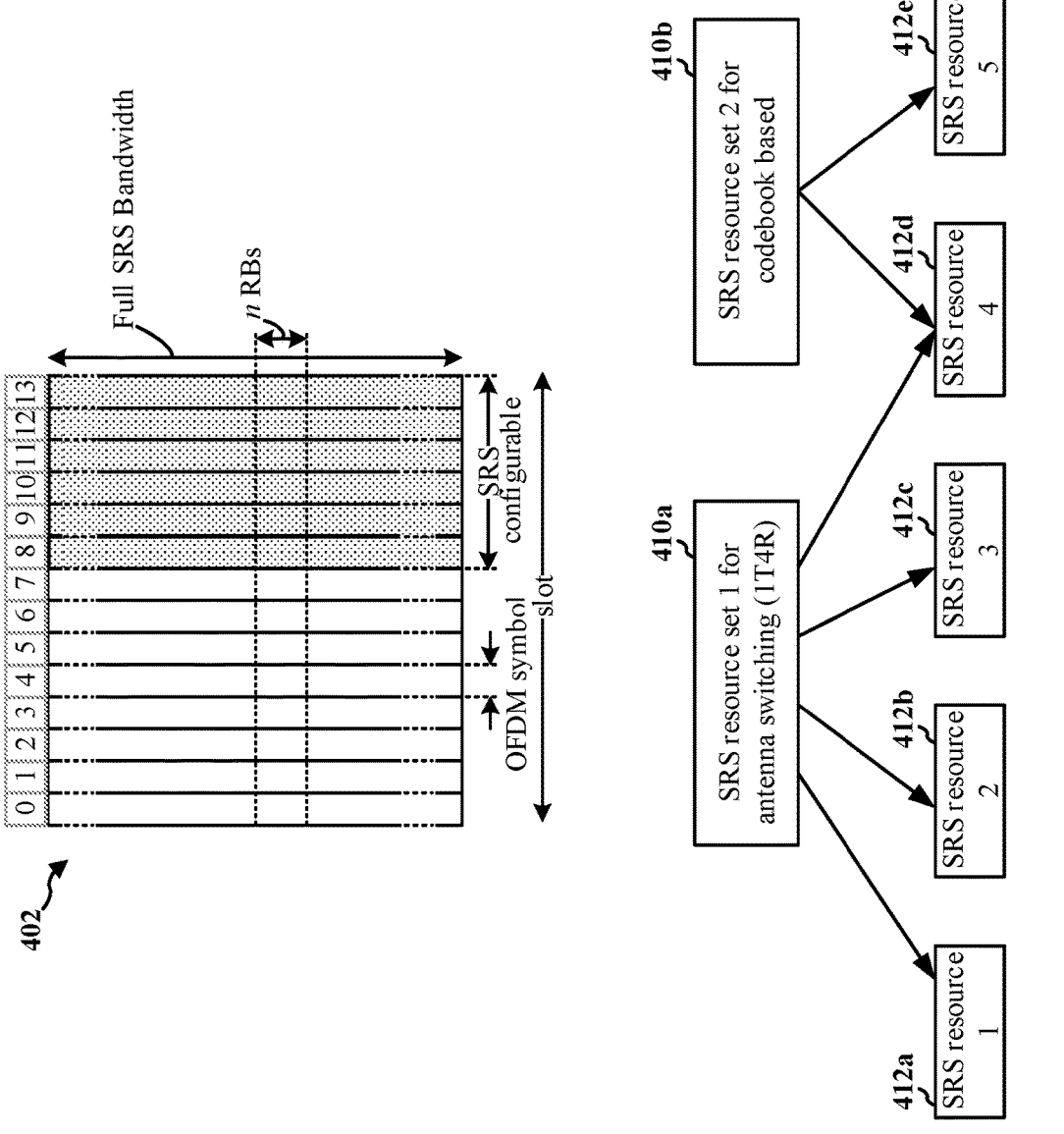
FIG. 4 is a diagram illustrating example configurations of sounding reference signal (SRS) resources for SRS transmission.

FIG. 4 is a diagram illustrating example configurations of SRS resources for SRS transmission, in accordance with various aspects of the present disclosure. In an access network of an example RAT, such as a 5G NR access network, a base station may estimate at least one channel on which transmissions are received from a UE (e.g., an uplink channel) using at least one SRS, which correspond to an SRS resource (although an SRS resource does not necessarily correspond to only one subcarrier over one symbol or an RE). The UE may transmit SRS on one or more SRS resources, which may be included in an SRS resource set.

Thus, a UE may transmit SRS to a base station (see, e.g., FIGS. 2C-2D, supra), and in so doing, all ports of an SRS resource are sounded in each symbol. While the UE may transmit SRS in a slot including an uplink channel (e.g., PUSCH), the SRS may sound over a wider bandwidth than the uplink channel. For example, the UE may sound all ports on a wideband carrier bandwidth by transmitting SRS on SRS resources of an SRS resource set.

According to various aspects, a slot 402 may be configured to include SRS on a set of RBs spanning an entire bandwidth of interest for a base station and a UE. Potentially, the entire bandwidth of interest may be configured for the UE by the base station. In some aspects, the bandwidth of interest may be a wideband carrier bandwidth or may be equal to the entire system bandwidth. In some other aspects, the bandwidth of interest may be less than an entire system bandwidth—e.g., a bandwidth of interest may be 36, 48, or 64 RBs (although different numbers of RBs are also possible for different bandwidths of interest).

A base station may signal the bandwidth of interest (e.g., the sounding bandwidth) to a UE, e.g., as part of an SRS configuration. In some aspects, the base station may signal the bandwidth of interest and/or other information associated with SRS configuration to the UE via RRC signaling. In some other aspects, the base station may signal the bandwidth of interest and/or other SRS configuration information using DCI (e.g., information included in DCI and/or a DCI Format) and/or a MAC control element (CE).

In the time domain, the slot 402 may be configured to support SRS resources that span a certain number of symbols, which may be adjacent (e.g., 1, 2, or 4 adjacent symbols) with up to 4 ports per SRS resource. According to some aspects, an SRS may only be transmitted in the last 6 symbols of the slot 402 (e.g., 5G NR Release 15 and Release 16 may support SRS transmission in the last 6 symbols of a slot). According to some other aspects, however, an SRS may be transmitted in any symbols of a slot (e.g., 5G NR Release 17 and beyond potentially may support SRS transmission in more than the last 6 symbols of a slot, such as all symbols of a slot).

In some aspects, the SRS may be transmitted in a slot after uplink data of that slot, such as uplink data carried on a PUSCH. For example, a PUSCH may be mapped to a subset of the symbols 0 through 13 of the slot 402. Next, the SRS may be mapped to a subset of the remaining symbols 8 through 13 of the slot 402—e.g., the SRS may be mapped to 1, 2, or 4 adjacent symbols within symbols 8 through 13 of the slot 402.

In order to transmit on SRS resources, the SRS resources may be included in an SRS resource set for a UE. An SRS resource set contains sets of SRS resources on which one UE transmits. The UE may be configured with multiple SRS resources, which may be grouped in an SRS resource set. Illustratively, a UE may be configured with SRS resource set 1 410a and/or SRS resource set 2 410b.

An SRS resource set may be configured to include one SRS resource or a group of multiple SRS resources, with the SRS resource(s) included therein being based on the use case for which the SRS is transmitted, such antenna switching, codebook-based, non-codebook-based, beam management, and the like. Illustratively, for SRS antenna switching use cases, 1 or 2 TX to 2 or 4 RX antenna switching may be supported, which may be denoted as "1T2R," "2T4R," "1T4R," and "1T4R/2T4R" where a UE supports both 1 TX to 4 RX and 2 TX to 4 RX antenna switching (however, antenna switching in which the numbers of TX and RX are equal may also be supported).

To support antenna switching, an SRS resource set is configured with two (for 1T2R or 2T4R) or four (for 1T4R) SRS resources transmitted in different symbols. Each SRS resource includes one (for 1T2R or 1T4R) or two (for 2T4R) antenna port(s). The SRS port(s) of each SRS resource may be associated with different UE antenna port(s).

As shown in one example of FIG. 4, the SRS resource set 1 410*a* is based on 1T4R, and therefore includes four SRS resources 1 through 4 412*a-d*. The four SRS resources 1 through 4 412*a-d* may occur in one slot, such as within four adjacent symbols of symbols 8 through 13 of the slot 402. However, other configurations may also be supported. For example, for 1T4R, two aperiodic SRS resource sets with a total of four SRS resources transmitted in different symbols of two different slots may be configured, instead of SRS resources 1 through 4 412*a-d* in one slot.

As further illustrated by FIG. 4, the SRS resource set 2 410*b* may be based on a use case of codebook-based transmission (e.g., for beamforming), such as when feedback of precoding information (e.g., PMI) and/or other information is configured to increase throughput at the receiver side (e.g., base station). The SRS resource set 2 410*b* may include SRS resource(s) based on codebook-based transmission, such as one SRS resource 5 412*e* or two SRS resources SRS resource 4 412*d* and SRS resource 5 412*e*. In some aspects, an SRS resource set (e.g., SRS resource set 2 410*b*) may be wideband in that the SRS resource(s) of the SRS resource set span the full SRS bandwidth (e.g., wideband carrier bandwidth) in a symbol.

Scheduling of SRS transmission may be periodic, semi-persistent, or aperiodic. Accordingly, a UE may be configured for aperiodic, semi-persistent, or periodic transmission of an SRS resource set. For aperiodic transmission of an SRS resource set, a base station may trigger SRS transmission by a UE via some signaling, such as DCI. In some aspects, two (2) bits in DL or UL DCI may trigger SRS transmission on SRS resources of an SRS resource set.

For example, a base station may transmit DCI to a UE that includes a field designated as an "SRS request" field, and such a field may include a value (e.g., two bits) triggering SRS transmission by a UE. In some instances, the base station may indicate an SRS resource set that the UE is to use for SRS transmission. Illustratively, the UE may be configured with one or more SRS resource sets for aperiodic SRS transmission, and each of the SRS resource sets may be associated with a respective value or other identifier, such as 1, 2, or 3. When the base station triggers SRS transmission by the UE, the base station may signal the respective value or other identifier corresponding to one of the SRS resource sets that the UE is to use for aperiodic SRS transmission.

In order to trigger the UE to use one SRS resource set, the base station may first configure the UE with the one or more SRS resource sets. The base station may transmit information configuring each of the one or more SRS resource sets to the UE via RRC signaling. In some aspects, each SRS resource set is configured via RRC signaling with two parameters, a first of which may identify the SRS resource set that the UE is to use for SRS transmission and a second of which may identify additional SRS resource set(s) that the UE may potentially use for SRS transmission.

In the context of some RATs, such as 5G NR, each of the first and second parameters may be included in one or more RRC messages as a respective field of an information element (IE), such as an SRS-Config IE. The first parameter may be associated with a field labeled aperiodicSRS-ResourceTrigger and may have a value of 1, 2, or 3, whereas the second parameter may be associated with a field labeled aperiodicSRS-ResourceTriggerList and may indicate an array of two values. Each value of the aforementioned fields may be referred to as a "code point" or a "DCI code point."

By way of illustration, Table 1 illustrates potential code points that configure aperiodic SRS transmission using SRS resource set(s). Specifically, the code points may be conveyed as one of the following values in an SRS request field of DCI.

TABLE 1

| Value of SRS request field | Triggered aperiodic SRS resource set(s) for DCI format 0_1, 1_1, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 | SRS resource set(s) configured with higher layer parameter usage in SRS-Resource Set set to 'antennaSwitching' and resourceType in SRS-ResourceSet set to 'aperiodic' for a $1^{st}$ set of serving cells configured by higher layers |
| 10 | SRS resource set(s) configured with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resource Type in SRS-ResourceSet set to 'aperiodic' for a $2^{nd}$ set of serving cells configured by higher layers |
| 11 | SRS resource set(s) configured with higher layer parameter aperiodicSRS-ResourceTrigger set to 3 or an entry in aperiodicSRS-ResourceTriggerList set to 3 | SRS resource set(s) configured with higher layer parameter usage in SRS-Resource Set set to 'antennaSwitching' and resource Type in SRS-ResourceSet set to 'aperiodic' for a $3^{rd}$ set of serving cells configured by higher layers |

FIG. 5 is a diagram 500 illustrating example SRS transmissions according to SRS resource allocations, in accordance with various aspects of the present disclosure. As described, supra, a frame structure employed in some RANs, such as 5G NR, may be FDD and/or TDD. With FDD, subframes within a set of subcarriers are dedicated for either downlink or uplink for that particular set of subcarriers (carrier system bandwidth)—e.g., uplink and downlink signaling may be communicated on different bands (or subbands), which may span an equal number of subcarriers and may be separated by a sufficient gap. In other words, FDD may utilize a paired spectrum for uplink and downlink communication.

TDD, however, may utilize an unpaired spectrum. Thus, subframes within a set of subcarriers are dedicated for both downlink and uplink for that particular set of subcarriers (carrier system bandwidth).

In order to transmit some signaling to the UE, a base station may precode such signaling. In particular, the base station may apply precoding (at least partially) to CSI-RS(s) transmitted to a UE. The (at least partial) precoding of CSI-RS may increase the efficiency of resource allocation for CSI-RSs allocated to UEs. The base station may rely on at least one frequency domain (FD) basis and/or spatial domain (SD) basis (e.g., including an FD-SD basis) for CSI-RS precoding.

In some aspects, the base station may be able to derive at least one FD-SD basis based on SRS transmission by the UE. However, the base station may be unable to combine some FD bases that are derived via measurements performed using UE-transmitted SRS if the SRS is sounded per band, e.g., due to phase jitter.

By way of illustration, a UE may be configured for SRS transmission on two SRS resources of an SRS resource set with hopping in the frequency domain between the SRS resources. According to such an example SRS configuration, the UE may transmit SRS over an uplink bandwidth 502 on a first SRS hop 510*a* in a first symbol x and on a second SRS hop 510*b* in the next consecutive symbol x+1. The first SRS hop 510*a* may correspond to a first portion of the full bandwidth, whereas the second SRS hop 510*b* may correspond to a second (different) portion of the full bandwidth. Therefore, the UE may sound over the full bandwidth, but may do so in multiple symbols with frequency hopping, and so only a portion of the full bandwidth is sounded in any one symbol with frequency hopping.

Consequently, the base station may be unable to combine each FD basis respectively determined for the bandwidth covered by the first SRS hop 510*a* and the bandwidth covered by the second SRS hop 510*b*. Specifically, phase jitter may prevent the base station from combining multiple FD bases respectively corresponding to portions of the bandwidth, and therefore, the base station may be unable to resolve precoding information to support the full bandwidth over which the base station may transmit CSI-RSs.

Rather, in order to apply precoding to CSI-RS in the downlink bandwidth 504, the base station may use a first set of bases 522 (e.g., FD-SD bases) corresponding to a first partial bandwidth 514*a* and a second set of bases 524 (e.g., FD-SD bases) corresponding to a second partial bandwidth 514*b*. The base station may derive the final precoding format and/or precoding matrix, which may be applied for precoding CSI-RS on the downlink bandwidth 504, by combining the first set of bases 522 and the second set of bases 524.

By way of illustration, the first set of bases 522 may be expressed as vectors and/or matrices $$W_1^{(1)} W_2^{(1)}$$

or $$W_1^{(1)} W_2^{(1)} W_f^{(1)},$$

whereas the second set of bases $$W_1^{(2)} W_2^{(2)}$$

or $$W_1^{(2)} W_2^{(2)} W_f^{(2)}.$$

In some aspects, $$W_1^{(1)} W_2^{(1)}$$

or $$W_1^{(1)} W_2^{(1)} W_f^{(1)}$$

may be combined with $$W_1^{(2)} W_2^{(2)}$$

or $$W_1^{(2)} W_2^{(2)} W_f^{(2)}$$

to obtain a precoding matrix or final precoding format, expressed as W. The precoding matrix or final precoding format may then be applied to CSI-RS transmitted by the base station over the CSI-RS bandwidth 512.

In view of the foregoing, precoding by a base station for a UE may be hampered by an SRS configuration in which frequency hopping is enabled for the UE. Accordingly, disabling frequency hopping during SRS transmission by a UE may resolve such an issue, thereby facilitating utilization of SRS by a base station in derivation of FD-SD bases for precoding (e.g., at least partially precoding CSI-RS for transmission to the UE).

However, frequency hopping during SRS transmission by a UE may remain applicable in some other instances. Therefore, entirely disabling frequency hopping during all SRS transmissions by the UE may be undesirable and potentially detrimental to effectively sounding all ports on SRS resources of an SRS resource set.

Thus, as described by the present disclosure, a UE may be configured with two or more resource allocations for each SRS resource of an SRS resource set. Each resource allocation may include a respective time resource allocation and a respective frequency resource allocation. That is, the UE may be configured with multiple resource allocations that each may include a respective time and frequency resource mapping, e.g., in which at least one set of time and frequency resources defined for each resource allocation. By configuring at least two resource allocations for each SRS resource of an SRS resource set, an increase in the number of (aperiodic) SRS resource sets may be avoided (e.g., as the same SRS resource set may be used, but with different time and/or frequency resource mappings), thereby avoiding or reducing the signaling overhead (e.g., RRC signaling overhead) that would otherwise be commensurate with configuring multiple SRS resource sets.

A UE may then select one of the two or more resource allocations when transmitting SRS. A base station may configure the UE with one of the multiple resource allocations according to which resources the UE should use for SRS transmission. In particular, the base station may determine which resource allocation is preferable for the context in which the SRS transmission is to be used, and then the base station may configure the UE with the preferable resource allocation.

Potentially, the base station may refrain from configuring the UE with a resource allocation. In such instances, the UE may (autonomously) select one of the resource allocations. For example, one of the resource allocations with which the UE is configured may be designated as a "default" resource allocation. When the UE does not receive information indicating which resource allocation the UE is to utilize for SRS transmission, the UE may select the default resource allocation.

Various aspects and other details related to SRS transmissions by UEs to base stations based on dynamic selections of resource allocations are further described herein.

Figure 6:
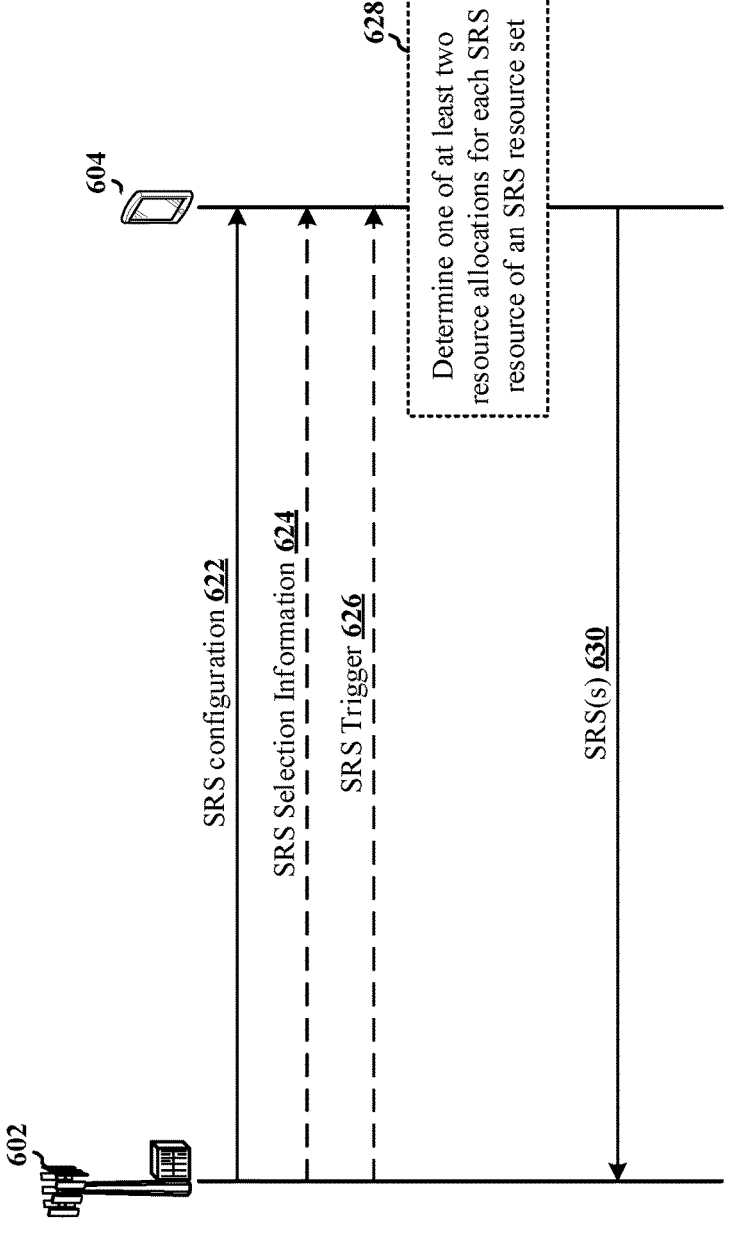
FIG. 6 is a call flow diagram illustrating example operations for SRS transmission by a UE based on selection of a resource allocation for a respective SRS resource of an SRS resource set.

FIG. 6 is a call flow diagram 600 illustrating example operations for SRS transmission by a UE based on selection of a resource allocation for a respective SRS resource of an SRS resource set, in accordance with various aspects of the present disclosure. In the context of FIGS. 1 and 3, the UE 604 may be implemented as the UE 104 and/or the UE 350, and the base station 602 may be implemented as the base station 102/180 and/or the base station 310.

In order to configure the UE 604 with resource allocations for SRS transmission, the base station 602 may determine (e.g., generate, allocate, schedule, etc.) at least two resource allocations for each SRS resource of an SRS resource set. Each of the at least two resource allocations may include a respective time resource allocation and a respective frequency resource allocation. That is, each resource allocation for a respective SRS resource may map SRS transmission to at least a symbol of a slot and a set of subcarriers or RBs (e.g., a portion of a carrier system bandwidth).

For example, each SRS resource may be associated with two values or other information that maps a respective SRS in the time domain and two values or other information that maps the respective SRS in the frequency domain. In the time domain, the two values or other information may include two symbols or two sets of symbols. In the frequency domain, the two values or other information may include two sets of subcarriers or two sets of RBs.

Each of the two resource allocations may include a time domain configuration for a respective SRS resource that defines at least one of a start position, a number of symbols, and/or a repetition factor. Illustratively, the start position may include information indicating a symbol of a slot to which the start of the respective SRS resource is mapped, such as an index corresponding to one of symbols 8 through 13 for normal CP (see, e.g., FIG. 4, supra). The number of symbols may indicate the number of (OFDM) symbols to which the SRS resource is mapped, such as one, two, or four. The repetition factor may indicate a number of equal consecutive SRS transmissions in symbols of a slot, which may be less than the number of symbols when frequency hopping is enabled.

Further, each of the two resource allocations may include a frequency domain configuration for a respective SRS resource that defines at least one of a frequency domain position, a frequency domain shift, a frequency hopping configuration, and/or a transmission comb configuration. The frequency domain position may indicate the frequency origin of the respective SRS resource in RBs with respect to the carrier origin. Along with the frequency domain position, the frequency domain shift indicates information to adjust the frequency allocation of the SRS resource to align with a common RB grid—e.g., the frequency domain shift may include shifts in multiples of four RBs.

The frequency hopping configuration may enable or disable frequency hopping for the respective SRS resource, and may define the frequency hopping pattern according to which the respective SRS resource is to be mapped. The transmission comb configuration may indicate a comb value (e.g., two, four, or eight) and/or a comb offset, and therefore, may define the subcarriers to which the respective SRS resource is mapped.

As described herein (e.g., with respect to FIG. 5, supra), configuring at least one resource allocation of an SRS resource set for wideband sounding may facilitate precoding by a base station, the base station 602 may configure one set of resource allocations for SRS resources of an SRS resource set to have frequency hopping disabled. However, the base station 602 may configure another set of resource allocations for SRS resources of an SRS resource set to have frequency hopping enabled, e.g., as frequency hopping may be desirable for SRS transmission in some contexts other than derivation of FD-SD bases.

In some aspects, the base station 602 may configure one set of resource allocations for SRS resources of an SRS resource set with one transmission comb configuration. The base station 602 may also configure another set of resource allocations for SRS resources of an SRS resource set to a different transmission comb configuration. By way of illustration and not limitation, the base station 602 may configure one set of resource allocations with a transmission comb of every two subcarriers and no offset for SRS resources of an SRS resource set, but may configure another set of resource allocations with a transmission comb of every four subcarriers and an offset of two for SRS resources of an SRS resource set.

The base station 602 may differently configure the transmission combs in different resource allocations for an SRS resource set in order to increase SRS capacity, which may be beneficial to the base station 602 for wideband sounding (e.g., when a relatively larger transmission comb size is configured). In some aspects, the base station 602 may configure some resource allocations of an SRS resource set for wideband sounding and other resource allocations of an SRS resource set for frequency hopping; however, the base station 602 may not necessarily configure those resource allocations of the SRS resource set to use one transmission comb and those other resource allocations of the SRS resource set to use another transmission comb. The converse of the foregoing may also be true—e.g., resource allocations may be configured to use frequency hopping but with different transmission combs.

The base station 602 may then transmit at least one SRS configuration 622 to the UE 604, and the at least one SRS configuration 622 may include information indicating each of the (time and frequency) resource allocations for a respective SRS resource of an SRS resource set to the UE 604. In some aspects, the base station 602 may transmit the at least one SRS configuration 622 to the UE 604 via RRC signaling.

For example, the at least one SRS configuration 622 may transmitted as an IE, such as an SRS-Config 1E having a set of fields indicating the at least two resource allocations. The at least one SRS configuration 622 may include at least one field associated with resource mapping (e.g., a resourceMapping field) that conveys a time-domain information of a resource allocation. Further, the at least one SRS configuration 622 may include one or more other fields associated with resource mapping (e.g., freqDomainPosition, freqDomainShift, transmissionComb, freqHopping fields) that convey the frequency-domain information of the resource allocation.

In some aspects, the at least one SRS configuration 622 may include at least two RRC IEs. One RRC IE transmitted by the base station 602 to the UE 604 may include resource allocations configured for wideband sounding with SRS resources of an SRS resource set, whereas another RRC IE transmitted by the base station 602 to the UE 604 may include resource allocations configured for frequency hopping with SRS resources of an SRS resource set.

In some other aspects, the at least one SRS configuration 622 may be one RRC IE. The one RRC IE transmitted by the base station 602 to the UE 604 may include resource allocations configured for wideband sounding with SRS resources of an SRS resource set, and may further include resource allocations configured for frequency hopping with SRS resources of an SRS resource set.

In some aspects, one or more additional fields may be added to an RRC IE in order to convey multiple resource allocations for SRS resources of an SRS resource set in one RRC IE. In some other aspects, one or more fields of an RRC IE may be extended in order to convey multiple resource allocations for SRS resources of an SRS resource set in one RRC IE.

In order to covey time-domain resource allocation information in an RRC IE, a "resource mapping" field (e.g., resourceMapping) may be extended to include a sequence of two (or more) such that each of the resource mapping subfields includes at least a first value for one resource allocation and a second value for another resource allocation. Specifically, a start position subfield (e.g., startPosition) may include a first value of a start position subfield for one resource allocation and a second value of the start position subfield for another resource allocation. A number of symbols subfield (e.g., nrofSymbols) may include a first value of a number of symbols subfield for one resource allocation and a second value of the number of symbols subfield for another resource allocation (e.g., each of the first and second values may be configured from an enumerated set of number of symbols values, such as {n1, n2, n4}). A repetition factor subfield (e.g., repetitionFactor) may include a first value of a repetition factor subfield for one resource allocation and a second value of the repetition factor subfield for another resource allocation (e.g., each of the first and second values may be configured from an enumerated set of repetition factor values, such as {n1, n2, n4}).

Similarly, in order to covey frequency-domain resource allocation information in an RRC IE, one or more fields of the RRC IE associated with frequency domain mapping may be extended to include a sequence of two (or more) such that each of the fields associated with frequency domain mapping includes at least a first value for one resource allocation and a second value for another resource allocation. Thus, a frequency domain position field (e.g., freqDomainPosition) may include a first value for one resource allocation and a second value for another resource allocation. For example, the frequency domain position field may include two integers, each configured from the set (0 . . . 67). Further, a frequency domain shift field (e.g., freqDomainShift) may include a first value for one resource allocation and a second value for another resource allocation. For example, the frequency domain shift field may include two integers, each configured from the set (0 . . . 268).

Additionally, a frequency hopping field may include a sequence of two (or more) of a set of subfields defining (and enabling) a frequency hopping pattern. For example, the frequency hopping field may include three subfields: (1) c-SRS; (2) b-SRS; and (3) b-hop. In order to covey information for each of the two (or more) resource allocations, two (or more) values for each of the foregoing subfields may be defined. Illustratively, a c-SRS subfield may include two integers configured from the set (0 . . . 63), a b-SRS subfield may include two integers configured from the set (0 . . . 3), and a b-hop subfield may include two integers configured from the set (0 . . . 3), and for each of the foregoing subfields, one of the respective integers is configured to correspond to one resource allocation (e.g., for wideband sounding) and another of the respective integers is configured to correspond to another resource allocation (e.g., with frequency hopping enabled).

Correspondingly, the UE 604 may receive the at least one SRS configuration 622 from the base station 602, e.g., via RRC signaling as an SRS-Config IE. The UE 604 may thus be configured with two sets of resource allocations for SRS resources of an SRS resource set, with one set of resource allocations being configured for wideband sounding and another set of resource allocations being configured for frequency hopping and/or default use.

The UE 604 may subsequently transmit SRS on SRS resources of an SRS resource set. However, the UE 604 may be configured for aperiodic SRS transmission. For example, an SRS resource set with which the UE 604 is configured may be configured to be aperiodic, and therefore, the base station 602 may transmit an SRS trigger 626 to the UE 604 that includes information triggering aperiodic SRS transmission by the UE 604. The SRS trigger 626 may be included in DCI or an RRC message, e.g., as further described herein.

Accordingly, the UE 604 may receive the SRS trigger 626 from the base station 602 and, based thereon, may transmit SRS on SRS resources of the SRS resource set using one of the at least two resource allocations configured for SRS resources of an SRS resource set. In order to do so, the UE 604 may first make a determination 628 of which of the at least two resource allocations the UE 604 is to use to map SRS resources of the SRS resource set.

The determination 628 by the UE 604 may be made at a point in time relatively proximate to that at which the UE 604 transmits SRS on SRS resources of an SRS resource set. Effectively, the UE 604 may dynamically determine the (time and frequency) resources to which the UE 604 is to map SRS resources of an SRS resource set, e.g., as the determination 628 by the UE 604 of which time and frequency resource allocations to use is contemporaneous with the reception of the SRS trigger 626.

In some aspects, the base station 602 may transmit SRS selection information 624 to the UE 604, and the SRS selection information 624 may include information configuring the UE 604 with one set of resource allocations for SRS resources of an SRS resource set. Therefore, the UE 604 may make the determination 628 of the one of at least two resource allocations for each SRS resource of an SRS resource set based on SRS selection information 624 received from the base station 602.

In some other aspects, however, the base station 602 may refrain from transmitting SRS selection information 624 to the UE 604. Thus, the UE 604 may not receive information from the base station 602 upon which the UE 604 may base the determination 628 of which resource allocations to use for an SRS resource set. When the UE 604 does not receive such SRS selection information 624 from the base station 602, the UE 604 may determine to use the "default" resource allocation for each SRS resource of the SRS resource set. For example, the default resource allocation for each SRS resource of the SRS resource set may be the resource allocation in which frequency hopping is enabled with a frequency hopping pattern.

When transmitted by the base station 602, the UE 604 may receive the SRS selection information 624 and, based thereon, may make the determination 628 of one of the at least two resource allocations to use for each SRS resource of the SRS resource set. The SRS selection information 624 may be transmitted by the base station 602 via DCI and/or RRC signaling. In some aspects, the SRS selection information 624 may be transmitted in the same message as the SRS trigger 626. In some other aspects, the SRS selection information 624 may be transmitted in a different message than that in which the SRS trigger 626 is transmitted.

In some aspects, an SRS resource set that is configured with multiple resource allocations for each SRS resource may be configured such that a specific trigger value corresponds to the resource allocations that are to be used for the SRS resource set. In order words, a one-to-one association may be configured between each trigger value and a respective set of resource allocations to be used for mapping the SRS resource set. For example, the SRS resource set may be configured with one aperiodic SRS resource trigger for one set of resource allocations and another aperiodic SRS resource trigger for another set of resource allocations—e.g., the SRS resource set may be configured with aperiodicSRS–ResourceTrigger=1 and aperiodicSRS–ResourceTriggerListM=2ds.

Such a one-to-one correspondence may be implemented as a dynamic indication via DCI, such as in an SRS request field. Thus, the base station 602 may set the SRS request field of a DCI message to a first value (e.g., 01) to trigger SRS transmission by the UE 604 using a first set of resource allocations for each SRS resource of the SRS resource set. Alternatively, the base station 602 may set the RS request field of a DCI message to a second value (e.g., 10) to trigger SRS transmission by the UE 604 using a second set of resource allocations for each SRS resource of the SRS resource set. Table 2 illustrates an example of a one-to-one association between SRS triggering and resource allocation selection for an SRS resource set.

TABLE 2

| DCI code point | Resource mapping |
|---|---|
| 01 | First resource mapping (e.g., frequency hopping over SRS resources of the SRS resource set) |
| 10 | Second resource mapping (e.g., wideband sounding with no frequency hopping) |

In some other aspects, the base station 602 may convey the SRS selection information 624 via DCI with a code point-based (dynamic) indication. Potentially, the DCI with such a code point-based indication may additionally function as the SRS trigger 626. In such other aspects, the base station 602 may indicate the SRS selection information 624 as a code point in DCI that is one of DCI scheduling data for the UE 604, DCI that does not schedule data for the UE 604, or DCI that is groupcast.

In some instances in which the base station 602 conveys the SRS selection information 624 via DCI that schedules data for the UE 604, a resource allocation table may be used for the code point to indicate the SRS selection information 624. For example, a code point column may be configured (e.g., added) to a time-domain resource allocation (TDRA) table or a frequency-domain resource allocation (FDRA) table associated with an uplink or downlink grant to indicate a slot offset. The code point column may then convey the code point that indicates the SRS selection information 624. The presence of a code point in the designated column of the TDRA or FDRA table may additionally function as the SRS trigger 626 that prompts the UE 604 to transmit SRS on the SRS resource set.

However, the base station 602 may transmit such scheduling DCI when the base station 602 actually has data to schedule for the UE 604 (e.g., on a PDSCH for downlink or a PUSCH for uplink), and therefore, the flexibility in dynamically configuring the UE 604 with one of the two or more resource allocations for each SRS resource of the SRS resource set may be reduced. That is, the base station 602 may transmit scheduling DCI including a code point for resource allocations of the SRS resource set when the base station 602 has uplink data (e.g., on a PUSCH) or downlink data (e.g., on a PDSCH) to schedule for the UE 604. As the base station 602 may not perpetually schedule uplink or downlink data for the UE 604, instances may occur in which the base station 602 is unable to transmit a code point indicating the SRS selection information 624 (and potentially the SRS trigger 626) to the UE 604 because the base station 602 does not have any uplink or downlink data to schedule for the UE 604.

In other instances in which the base station 602 conveys SRS selection information 624 via DCI that does not schedule data for the UE 604, one or more fields may be repurposed or reused to indicate which of the two of more sets of resource allocations the UE 604 is to use for the SRS resources of the SRS resource set. Specifically, one or more "unused" bits of a DCI field that may be unused in such non-scheduling DCI may be repurposed as a code point that indicates the SRS selection information 624.

For example, DCI that does not schedule data for the UE 604 may include a field associated with a modulation and coding scheme (MCS) to be employed by the UE 604 for the data. The MCS field may include multiple bits (e.g., five bits), and some or all of the bits of the MCS field may instead be used to convey a code point corresponding to which of the resource allocations the UE 604 is to use for SRS transmission. Such a code point may additionally function as the SRS trigger 626 that prompts the UE 604 to transmit SRS on the SRS resource set.

In some further instances in which the base station 602 conveys SRS selection information 624 via DCI that is groupcast (e.g., GC-DCI), a set of bits assigned to the UE 604 may be used to indicate the SRS selection information 624. For example, groupcast DCI may include one or more blocks of bits (e.g., a block of bits may include one or more bits), with each block of bits being assigned to a respective UE of the group including the UE 604. The base station 602 may set one or more bits of the block of bits respectively assigned to the UE 604 to indicate the SRS selection information 624. In particular, the base station 602 may set one or more bits of the block of bits respectively assigned to the UE 604 to one code point that corresponds to the resource allocation of each SRS resource of the SRS resource set. The base station 602 may additionally convey the SRS trigger 626 in the block of bits respectively assigned to the UE 604, e.g., as an implicit indication in the code point or as an explicit indication in one or more other bits different from those used to convey the SRS selection information 624.

In still other aspects, the base station 602 may convey the SRS selection information 624 via an aperiodic CSI request. Illustratively, the base station 602 may use an aperiodic CSI request to jointly trigger aperiodic CSI reporting and aperiodic SRS transmission with one of the at least two resource allocations configured for each SRS resource of the SRS resource set. For example, the base station 602 may configure the aperiodic CSI request in uplink DCI of format 0_0, 0_1, and/or 0_2 to jointly trigger aperiodic CSI reporting and aperiodic SRS transmission with the resource allocations of the SRS resource set configured for wideband sounding (that is, frequency hopping may be disabled for each SRS resource of the SRS resource set). As the aperiodic CSI request may jointly trigger aperiodic SRS transmission, the aperiodic CSI request may function as the SRS trigger 626 in addition to the SRS selection information 624.

In order to configure the UE 604 to use the other resource allocation for each SRS resource of the SRS resource set, the base station 602 may individually trigger aperiodic SRS transmission (e.g., via a DCI field separate from that conveying the aperiodic CSI request). The individual trigger of aperiodic SRS transmission may therefore indicate both the SRS trigger 626 and the SRS selection information 624, with the SRS selection information 624 being implicitly indicated via the individual triggering of the aperiodic SRS transmission.

Implicitly indicating the SRS selection information 624 via an individual trigger for aperiodic SRS transmission may configure the UE 604 to use the other, or default, resource allocation for each SRS resource of the SRS resource set. For example, the individual trigger for aperiodic SRS transmission may implicitly indicate that a respective resource allocation in which frequency hopping is enabled is to be used for each SRS resource of the SRS resource set.

Accordingly, the UE 604 may receive the SRS selection information 624 and the SRS trigger 626 from the base station 602—e.g., potentially in the same message, such as DCI, and/or with one or both of the SRS selection information 624 and/or the SRS trigger 626 being implicitly indicated. Based on the SRS selection information 624, the UE 604 may make the determination 628 of one of the at least two (time and frequency) resource allocations for each SRS resource of an SRS resource set. As aforementioned, if the SRS selection information 624 is absent, the UE 604 may determine to use a default resource allocation for each SRS resource of the SRS resource set. However, if the SRS selection information 624 indicates one of the at least two resource allocations for each SRS resource, then the UE 604 may determine to use the indicated (time and frequency) resource allocation for each SRS resource of the SRS resource set.

According to various aspects, the UE 604 may map each SRS resource of the SRS resource set to time and frequency resource(s) corresponding to the respective time and frequency resource allocation based on the determination 628. The UE 604 may then transmit SRS 630 on those time and frequency resource(s) to which each SRS resource of the SRS resource set is mapped. Correspondingly, the base station 602 may receive, from the UE 604, SRS 630 on those time and frequency resource(s) to which the UE 604 mapped each SRS resource of the SRS resource set.

Referring to FIG. 7, a diagram 700 illustrates example resource allocations for SRS transmission, in accordance with various aspects of the present disclosure. For example, the first resource allocation 702 may be a default resource allocation, whereas the second resource allocation 704 may be a resource allocation for wideband sounding.

In the context of FIG. 6, the base station 602 may transmit the SRS configuration 622 to the UE 604 that indicates the first and second resource allocations 702, 704. Further, the base station 602 may transmit the SRS selection information 624 to the UE 604 in order to indicate which of the first or second resource allocations 702, 704 the UE 604 is to use. Based on the SRS selection information 624, the UE 604 may make a determination 628 to use either the first resource allocation 702 or the second resource allocation 704.

In the illustrated example, an SRS resource set 710 may include four SRS resources 712*a-d*. When the UE 604 determines to use the first resource allocation 702 (e.g., the default resource allocation), the UE 604 may map a first SRS resource 712*a* to a first set of RBs in (OFDM) symbol 10, a second SRS resource 712*b* to a second set of RBs in symbol 11, a third SRS resource 712*c* to a third set of RBs in symbol 12, and a fourth SRS resource 712*d* to a fourth set of RBs in symbol 13. As frequency hopping may be enabled according to the first resource allocation, the UE 604 may map each of the SRS resources 712*a-d* to a different portion of the wideband bandwidth over symbols 10 through 13. The UE 604 may then transmit the SRS 630 on the resources to which the SRS resources 712*a-d* of the SRS resource set 710 are mapped.

However, when the UE 604 determines to use the second resource allocation 704 (e.g., for wideband sounding), the UE 604 may map each of the SRS resources 712*a-d* to a different portion of the wideband bandwidth but may map each of the SRS resources 712*a-d* to the (OFDM) symbol 10. The UE 604 may then transmit the SRS 630 on the resources to which the SRS resources 712*a-d* of the SRS resource set 710 are mapped, which may sound over the wideband bandwidth because frequency hopping is disabled.

Figure 8:
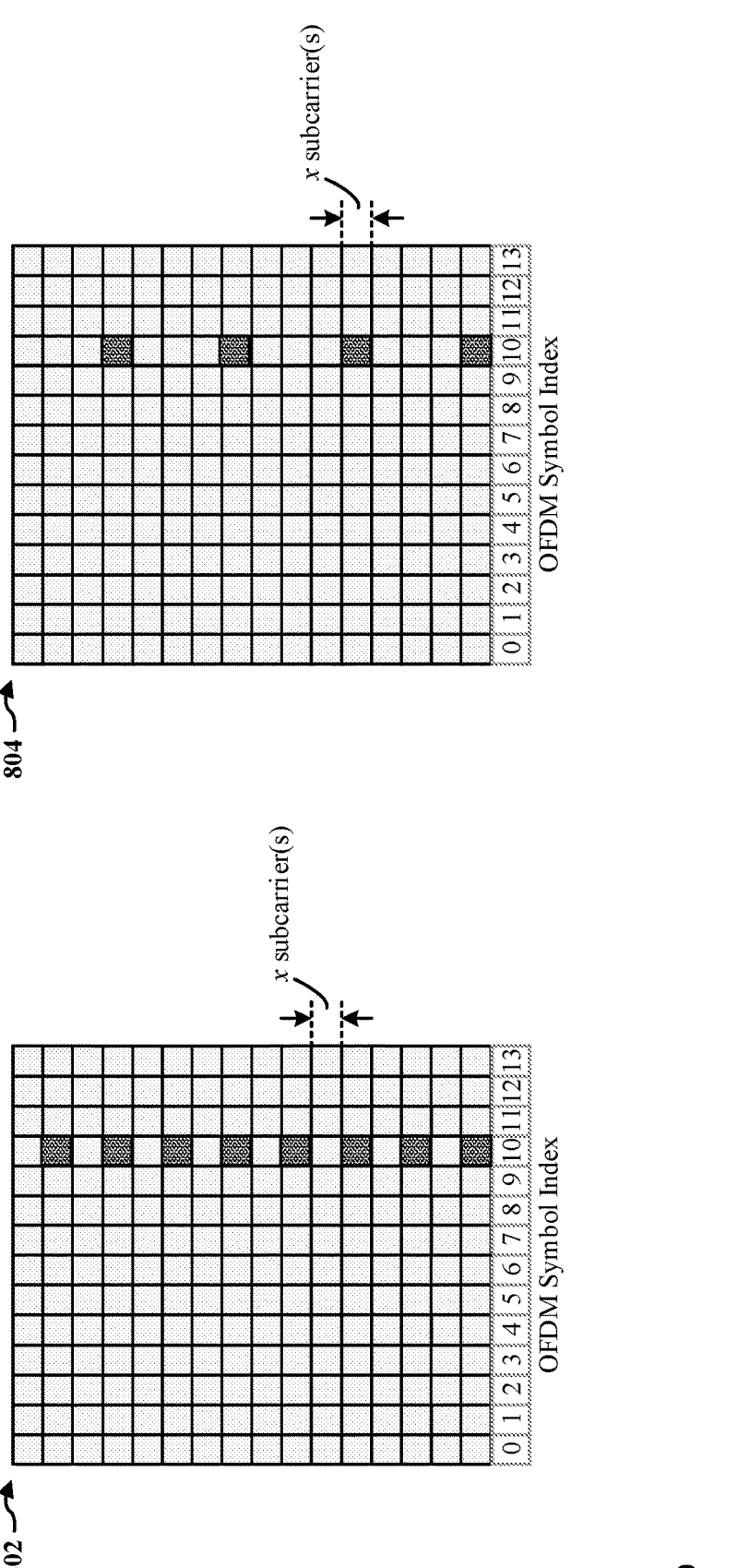
FIG. 8 is a diagram illustrating other example resource allocations for SRS transmission.

FIG. 8 is a diagram 800 illustrating other example resource allocations for SRS transmission, in accordance with various aspects of the present disclosure. Specifically, FIG. 8 illustrates a first resource allocation 802 and a second resource allocation 804 for one SRS resource of an SRS resource set. In the first resource allocation 802, the transmission comb may be configured with a value of two and the comb offset may be configured with a value of zero (or no offset). The second resource allocation 804 may similarly include a comb offset configured with a value of zero (or no offset), but may include a transmission comb configured with a value of four.

When the UE 604 determines to use the first resource allocation 702 (e.g., the default resource allocation), the UE 604 may map a first SRS resource 810 to a first set of subcarriers in (OFDM) symbol 10. Specifically, as the transmission comb may be configured with a value of two, the UE 604 may map the first SRS resource 810 to every other subcarrier in the portion of the bandwidth (e.g., set of RBs) on which the first SRS resource 810 is configured to be carried. In symbol 10, the UE 604 may then transmit the SRS 630 of the first SRS resource 810 on every other subcarrier of the frequency bandwidth on which the first SRS resource 810 is configured.

However, the transmission comb may be configured with a value of four for the second resource allocation 804. Thus, the UE 604 may map the first SRS resource 810 to every fourth subcarrier in the portion of the bandwidth (e.g., set of RBs) on which the first SRS resource 810 is configured to be carried. In symbol 10, the UE 604 may then transmit the SRS 630 of the first SRS resource 810 on every fourth subcarrier of the frequency bandwidth on which the first SRS resource 810 is configured.

FIG. 9 is a flowchart 900 of a method of wireless communication by a UE, in accordance with various aspects of the present disclosure. The method may be performed by a UE (e.g., the UE 104, 350, 604) and/or another apparatus (e.g., the apparatus 1102). According to different aspects, one or more of the operations illustrated in the flowchart 900 may be transposed, omitted, and/or contemporaneously performed. For example, operations illustrated with dashed lines may be omitted in some aspects.

At 902, the UE may receive, from a base station, an SRS configuration indicating at least two resource allocations for each SRS resource of an SRS resource set. Each of the at least two resource allocations may include a respective time resource allocation and a respective frequency resource allocation. In the context of FIG. 6, the UE 604 may receive the SRS configuration 622 from the base station 602.

In some aspects, the time resource allocation of each of the at least two resource allocations may be configured with one or more of a start position, a number of symbols, or a repetition factor associated with resource mapping of the respective SRS resource. In some other aspects, the frequency resource allocation of each of the at least two resource allocations may be configured with one or more of a frequency domain position or a frequency domain shift associated with resource mapping of the respective SRS resource.

At 904, the UE may receive, from the base station, information configuring selection of one of the at least two resource allocations. In the context of FIG. 6, the UE 604 may receive, from the base station 602, the SRS selection information 624.

In some aspects, the information configuring selection of the one of the at least two resource allocations may be included in a trigger value associated with aperiodic SRS transmission. In some further aspects, the trigger value has a one-to-one association with the one of the at least two resource allocations for each SRS resource of the SRS resource set.

In still further aspects, the information configuring selection of one of the at least two resource allocations may be included in DCI. The DCI may include at least one code point, and the at least one code point may indicate the information configuring selection of the one of the at least two resource allocations.

In some additional aspects, the DCI may be one of DCI scheduling information for the UE, DCI from which the scheduling information is absent, or DCI that is groupcast. For example, the DCI from which the scheduling information is absent may include a set of bit fields associated with scheduling data, and at least one code point indicating the information configuring selection of the one of the at least two resource allocations may be included in the set of bit fields associated with scheduling data. In another example, the DCI scheduling information for the UE may include at least one code point associated with at least one of a time-domain resource allocation or a frequency-domain resource allocation, and at least one code point indicating the information configuring selection of the one of the at least two resource allocations may be indicated by the at least one code point associated with the at least one of the time-domain resource allocation or the frequency-domain resource allocation. In a further example, the DCI that is groupcast may include a block of bits assigned to the UE, and at least one code point indicating the information configuring selection of the one of the at least two resource allocations may be included in the block of bits assigned to the UE.

In yet other aspects, the information configuring selection of the one of the at least two resource allocations for the respective SRS resource may indicate the one of the at least two resource allocations is a wideband resource allocation when the SRS on the respective SRS resource of the SRS resource set is jointly triggered based on an aperiodic CSI request included in the DCI. Additionally or alternatively, the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

At 906, the UE may select one of the at least two resource allocations for each SRS resource of the SRS resource set. The UE may select one of the at least two resource allocations for each SRS resource of the SRS resource set based on the information configuring selection of the one of the at least two resource allocations received from the base station. For example, first the UE may identify a value (e.g., a code point) associated with the SRS resource set. In some aspects, the value may additionally trigger aperiodic SRS transmission by the UE. Next, the UE may determine which of the at least two resource allocations for each SRS resource corresponds to the identified value (e.g., code point). In some aspects, the UE may store a lookup table or other mapping of values (e.g., code points) to resource allocations for each SRS resource, and the UE may identify the resource allocation for each SRS resource that corresponds to the identified value based on the lookup table or other mapping. In the context of FIG. 6, the UE 604 may make the determination 628 of one of the at least two resource allocations for each SRS resource of the SRS resource set. In some aspects, the UE 604 may make the determination 628 based on the SRS selection information 624 received from the base station 602.

In some aspects, the frequency resource allocation of the one of the at least two resource allocations for the respective SRS resource may be configured without frequency hopping, and the frequency resource allocation of another of the at least two resource allocations for the respective SRS resource is configured with frequency hopping.

In some other aspects, the frequency resource allocation of the one of the at least two resource allocations for the respective SRS resource may be configured with one transmission comb value, and the frequency resource allocation of another of the at least two resource allocations for the respective SRS resource may be configured with another transmission comb value.

In still other aspects, the one of the at least two resource allocations may be selected based on a default selection that is preconfigured in the UE.

At 908, the UE may transmit, to the base station, an SRS on a respective SRS resource of the SRS resource set based on the (determined) one of the at least two resource allocations for the respective SRS resource. In the context of FIG. 6, the UE 604 may transmit, to the base station 602, SRS 630 on a respective SRS resource of the SRS resource set based on one of the at least two resource allocations for the respective SRS resource. The one of the at least two resource allocations for the respective SRS resource may be based on the determination 628 by the UE 604.

In some aspects, the UE may receive DCI that may include at least one code point, and the at least one code point may indicate the information configuring selection of the one of the at least two resource allocations. The at least one code point may further trigger the transmission of the SRS on the respective SRS resource of the SRS resource set.

FIG. 10 is a flowchart 1000 of a method of wireless communication by a base station, in accordance with various aspects of the present disclosure. The method may be performed by a base station (e.g., the base station 102/180, 310, 602) and/or another apparatus (e.g., the apparatus 1202). According to different aspects, one or more of the operations illustrated in the flowchart 1000 may be transposed, omitted, and/or contemporaneously performed. For example, operations illustrated with dashed lines may be omitted in some aspects.

At 1002, the base station may transmit, to a UE, an SRS configuration indicating at least two resource allocations for each SRS resource of an SRS resource set. Each of the at least two resource allocations may include a respective time resource allocation and a respective frequency resource allocation. In the context of FIG. 6, the base station 602 may transmit the SRS configuration 622 to the UE 604.

In some aspects, the time resource allocation of each of the at least two resource allocations may be configured with one or more of a start position, a number of symbols, or a repetition factor associated with resource mapping of the respective SRS resource. In some other aspects, the frequency resource allocation of each of the at least two resource allocations may be configured with one or more of a frequency domain position or a frequency domain shift associated with resource mapping of the respective SRS resource.

At 1004, the base station may transmit, to the UE, information configuring selection of one of the at least two resource allocations. In the context of FIG. 6, the base station 602 may transmit, to the UE 604, the SRS selection information 624.

In some aspects, the information configuring selection of the one of the at least two resource allocations may be included in a trigger value associated with aperiodic SRS transmission. In some further aspects, the trigger value has a one-to-one association with the one of the at least two resource allocations for each SRS resource of the SRS resource set.

In still further aspects, the information configuring selection of one of the at least two resource allocations may be included in DCI. The DCI may include at least one code point, and the at least one code point may indicate the information configuring selection of the one of the at least two resource allocations.

In some additional aspects, the DCI may be one of DCI scheduling information for the UE, DCI from which the scheduling information is absent, or DCI that is groupcast. For example, the DCI from which the scheduling information is absent may include a set of bit fields associated with scheduling data, and at least one code point indicating the information configuring selection of the one of the at least two resource allocations may be included in the set of bit fields associated with scheduling data. In another example, the DCI scheduling information for the base station may include at least one code point associated with at least one of a time-domain resource allocation or a frequency-domain resource allocation, and at least one code point indicating the information configuring selection of the one of the at least two resource allocations may be indicated by the at least one code point associated with the at least one of the time-domain resource allocation or the frequency-domain resource allocation. In a further example, the DCI that is groupcast may include a block of bits assigned to the UE, and at least one code point indicating the information configuring selection of the one of the at least two resource allocations may be included in the block of bits assigned to the UE.

In yet other aspects, the information configuring selection of the one of the at least two resource allocations for the respective SRS resource may indicate the one of the at least two resource allocations is a wideband resource allocation when the SRS on the respective SRS resource of the SRS resource set is jointly triggered based on an aperiodic CSI request included in the DCI. Additionally or alternatively, the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

At 1008, the base station may receive, from the UE, an SRS on a respective SRS resource of the SRS resource set based on one of the at least two resource allocations for the respective SRS resource. In the context of FIG. 6, the base station 602 may receive, from the UE 604, SRS 630 on a respective SRS resource of the SRS resource set based on one of the at least two resource allocations for the respective SRS resource. The one of the at least two resource allocations for the respective SRS resource may be based on the SRS selection information 624 transmitted by the base station 602.

In some aspects, the frequency resource allocation of the one of the at least two resource allocations for the respective SRS resource may be configured without frequency hopping, and the frequency resource allocation of another of the at least two resource allocations for the respective SRS resource is configured with frequency hopping.

In some other aspects, the frequency resource allocation of the one of the at least two resource allocations for the respective SRS resource may be configured with one transmission comb value, and the frequency resource allocation of another of the at least two resource allocations for the respective SRS resource may be configured with another transmission comb value.

In still other aspects, the one of the at least two resource allocations may be selected based on a default selection that is preconfigured in the UE.

In further aspects, the base station may transmit DCI that may include at least one code point, and the at least one code point may indicate the information configuring selection of the one of the at least two resource allocations. The at least one code point may further trigger the transmission of the SRS on the respective SRS resource of the SRS resource set.

Figure 11:
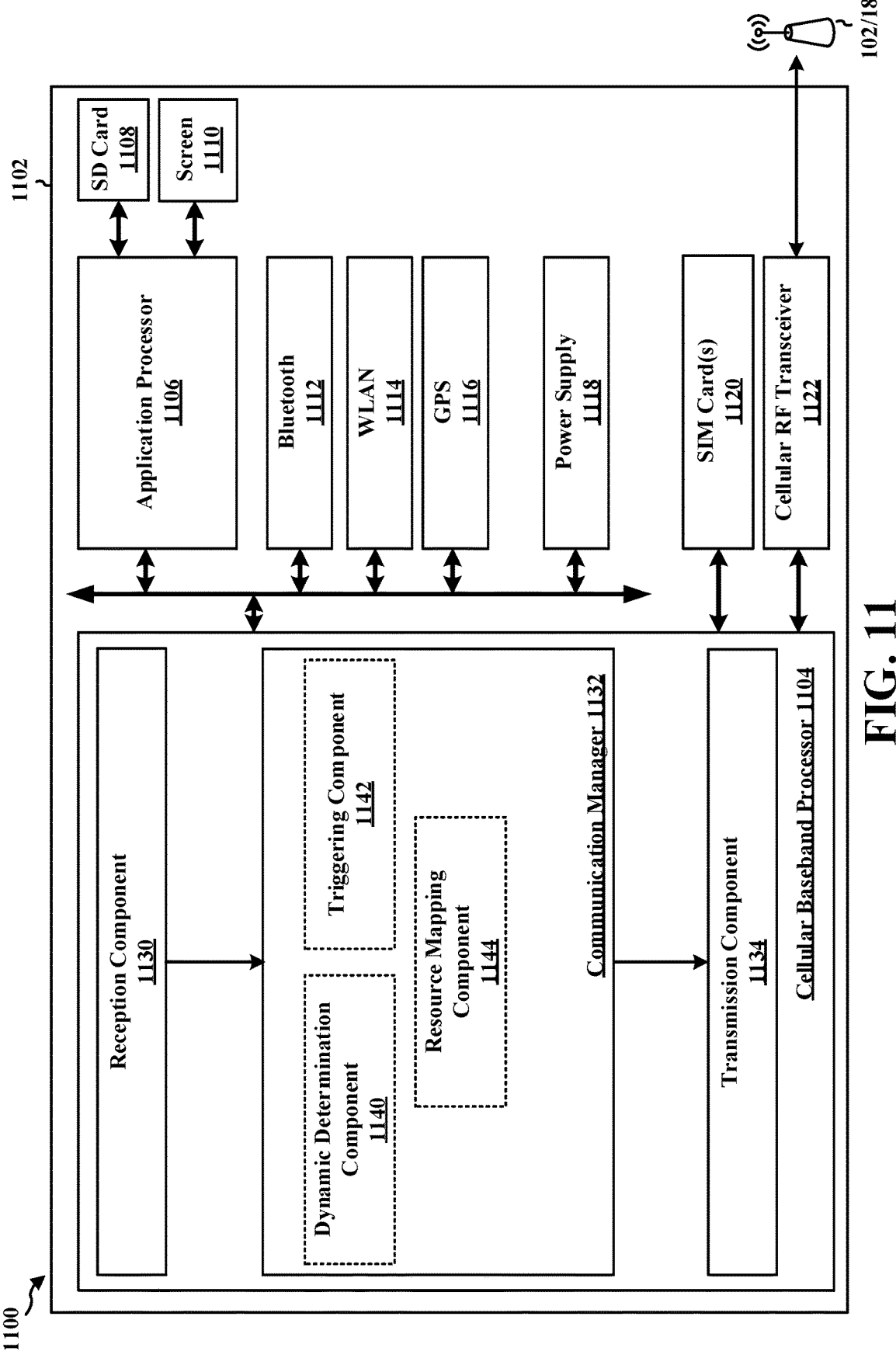
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The reception component 1130 may be configured to receive, from the base station 102/180, an SRS configuration indicating at least two resource allocations for each SRS resource of an SRS resource set, e.g., as described in connection with 902 of FIG. 9. In some aspects, each of the at least two resource allocations may include a time resource allocation and a frequency resource allocation.

The reception component 1130 may be further configured to receive, from the base station 102/180, information configuring selection of one of the at least two resource allocation, e.g., as described in connection with 904 of FIG. 9.

The communication manager 1132 includes a dynamic determination component 1140 that receives input(s) of the at least two resource allocations and the information configuring selection of one of the at least two resource allocations from the reception component 1130 and is configured to select one of the at least two resource allocations for each SRS resource of the SRS resource set, e.g., as described in connection with 906 of FIG. 9.

The communication manager 1132 further includes a triggering component 1142 that is configured to determine that aperiodic SRS transmission is triggered to the apparatus 1102. For example, the triggering component 1142 may receive input(s) from the base station 102/180 through the reception component 1130 indicating the apparatus 1102 is to transmit SRS on the SRS resources of the SRS resource set.

The communication manager 1132 further includes a resource mapping component 1144 that receives input(s) of the at least two resource allocations from the reception component 1130 and the selected one of the at least two resource allocations for each SRS resource of the SRS resource set from the dynamic determination component 1140 and is configured to map each SRS resource of the SRS resource set to a respective time and frequency resource(s) based on the selected one of the at least two resource allocations configured for the respective SRS resource.

The transmission component 1134 is configured to transmit, to the base station 102/180, an SRS on a respective SRS resource of the SRS resource set based on one of the at least two resource allocations for the respective SRS resource, e.g., as described in connection with 908 of FIG. 9. The transmission component 1134 may transmit the SRS on the respective SRS resource of the SRS resource set in response to input from the triggering component 1142. The transmission component 1134 may transmit an SRS on a respective SRS resource of the SRS resource set according to the mapping of each SRS resource of the SRS resource set to a respective time and frequency resource(s), as configured by the resource mapping component 1144.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, an SRS configuration indicating at least two resource allocations for each SRS resource of an SRS resource set, and each of the at least two resource allocations may include a time resource allocation and a frequency resource allocation. The apparatus 1102, and in particular the cellular baseband processor 1104, further includes means for transmitting, to the base station, an SRS on a respective SRS resource of the SRS resource set based on one of the at least two resource allocations for the respective SRS resource.

In some aspects, the time resource allocation of each of the at least two resource allocations is configured with one or more of a start position, a number of symbols, or a repetition factor associated with resource mapping of the respective SRS resource. In some other aspects, the frequency resource allocation of the one of the at least two resource allocations for the respective SRS resource is configured without frequency hopping, and the frequency resource allocation of another of the at least two resource allocations for the respective SRS resource is configured with frequency hopping.

In some aspects, the frequency resource allocation of each of the at least two resource allocations is further configured with one or more of a frequency domain position or a frequency domain shift associated with resource mapping of the respective SRS resource. In some other aspects, the frequency resource allocation of the one of the at least two resource allocations for the respective SRS resource is configured with one transmission comb value, and the frequency resource allocation of another of the at least two resource allocations for the respective SRS resource is configured with another transmission comb value.

The apparatus 1102, and in particular the cellular baseband processor 1104, may further include means for selecting the one of the at least two resource allocations for the respective SRS resource. In some aspects, the one of the at least two resource allocations is selected based on a default selection that is preconfigured.

The apparatus 1102, and in particular the cellular baseband processor 1104, may further include means for receiving, from the base station, information configuring selection of the one of the at least two resource allocations, and the one of the at least two resource allocations may be selected based on the information configuring selection.

In some aspects, the information configuring selection of the one of the at least two resource allocations includes a trigger value associated with aperiodic SRS transmission. In some other aspects, the trigger value has a one-to-one association with the one of the at least two resource allocations for each SRS resource of the SRS resource set. In still other aspects, the information configuring selection includes DCI.

In some aspects, the DCI includes at least one code point, and the at least one code point indicates the information configuring selection of the one of the at least two resource allocations. In some other aspects, the at least one code point further triggers the transmitting of the SRS on the respective SRS resource of the SRS resource set. In still other aspects, the DCI may include one of DCI scheduling information for the UE, DCI from which the scheduling information is absent, or DCI that is groupcast.

In some aspects, the DCI from which the scheduling information is absent includes a set of bit fields associated with scheduling data, and at least one code point indicating the information configuring selection of the one of the at least two resource allocations is included in the set of bit fields associated with scheduling data.

In some aspects, the DCI scheduling information for the UE includes at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

In some aspects, the DCI that is groupcast includes a block of bits assigned to the UE, and at least one code point indicating the information configuring selection of the one of the at least two resource allocations is included in the block of bits assigned to the UE.

In some aspects, the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

In some aspects, the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
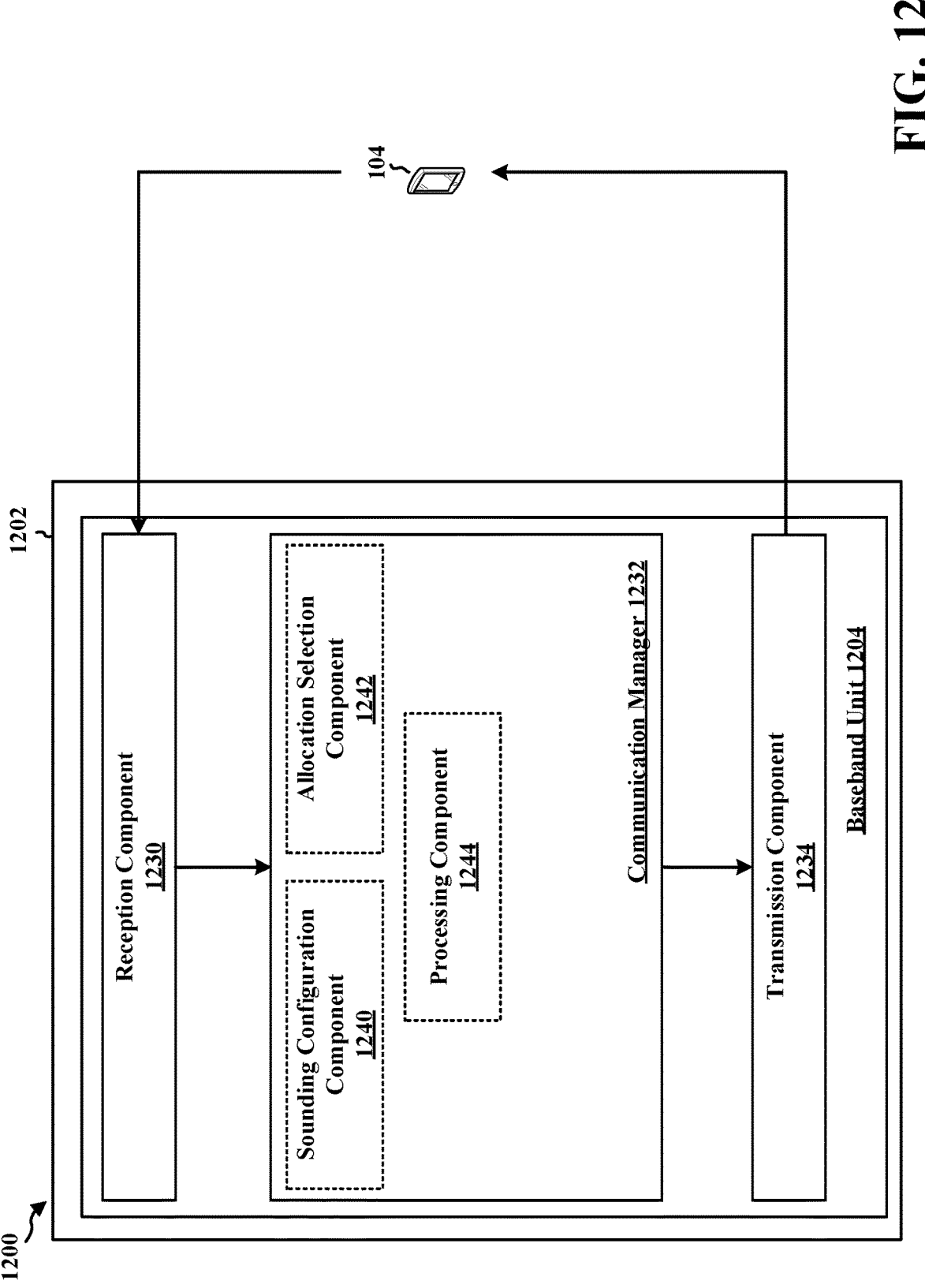
FIG. 12 is a diagram illustrating another example of a hardware implementation for another example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a sounding configuration component 1240 that is configured to determine, for the UE 104, an SRS configuration indicating at least two resource allocations for each SRS resource of an SRS resource set. Each of the at least two resource allocations may include a time resource allocation and a frequency resource allocation.

The transmission component 1234 may transmit, to the UE 104, the SRS configuration indicating at least two resource allocations for each SRS resource of an SRS resource set, e.g., as described in connection with 1002 of FIG. 10.

The communication manager 1232 further includes an allocation selection component 1242 that configures selection of one of the at least two resource allocations for each SRS resource of the SRS resource set.

The transmission component 1234 may transmit, to the UE 104, information configuring selection of one of the at least two resource allocations for each SRS resource of the SRS resource set, e.g., as described in connection with 1004 of FIG. 10.

The reception component 1230 may receive, from the UE 104, an SRS on a respective SRS resource of the SRS resource set based on one of the at least two resource allocations for the respective SRS resource, e.g., as described in connection with 1006 of FIG. 10.

The communication manager 1232 further includes a processing component 1244 that processes the SRS received on each SRS resource of the SRS resource set. For example, the processing component 1244 may be configured to perform SRS measurements on the received SRS, and may derive FD-SD bases according to the SRS measurements. The processing component 1244 may be configured to determine precoding information (e.g., a precoding matrix and/or precoding format) for CSI-RS based on the derived FD-SD bases.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a UE, an SRS configuration indicating at least two resource allocations for each SRS resource of an SRS resource set, and each of the at least two resource allocations may include a time resource allocation and a frequency resource allocation. The apparatus 1202, and in particular the baseband unit 1204, further includes means for receiving, from the UE, an SRS on a respective SRS resource of the SRS resource set based on one of the at least two resource allocations for the respective SRS resource.

In some aspects, the time resource allocation of each of the at least two resource allocations includes one or more of a start position, a number of symbols, or a repetition factor associated with resource mapping of the respective SRS resource. In some other aspects, the frequency resource allocation of the one of the at least two resource allocations for the respective SRS resource is configured without frequency hopping, and another of the at least two resource allocations for the respective SRS resource is configured with frequency hopping.

In some aspects, the frequency resource allocation of each of the at least two resource allocations is further configured with one or more of a frequency domain position or a frequency domain shift associated with resource mapping of the respective SRS resource. In some other aspects, the frequency resource allocation of the one of the at least two resource allocations for the respective SRS resource is configured with one transmission comb value, and the frequency resource allocation of another of the at least two resource allocations for the respective SRS resource is configured with another transmission comb value.

The apparatus 1202, and in particular the baseband unit 1204, may further include means for transmitting, to the UE, information configuring selection of the one of the at least two resource allocations, and the SRS is received using the one of the at least two resource allocations based on the information configuring selection.

In some aspects, the information configuring selection includes DCI. In some other aspects, the DCI includes at least one code point, and the at least one code point indicates the information configuring selection of the one of the at least two resource allocations. In still other aspects, the at least one code point further triggers the transmitting of the SRS on the respective SRS resource of the SRS resource set, and the SRS resource set is aperiodic.

In some aspects, the DCI includes one of DCI scheduling information for the UE, DCI from which the scheduling information is absent, or DCI that is groupcast. In some other aspects, the DCI from which the scheduling information is absent includes a set of bit fields associated with scheduling data, and at least one code point indicating the information configuring selection of the one of the at least two resource allocations is included in the set of bit fields associated with scheduling data.

In still other aspects, the DCI scheduling information for the UE includes at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

In some aspects, the DCI that is groupcast includes a block of bits assigned to the UE, and at least one code point indicating the information configuring selection of the one of the at least two resource allocations is included in the block of bits assigned to the UE.

In some other aspects, the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

In some aspects, the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:

receiving, from a base station, a sounding reference signal (SRS) configuration indicating at least two resource allocations for each SRS resource of an SRS resource set, each of the at least two resource allocations comprising a time resource allocation and a frequency resource allocation;

based on a determination that an information configuring selection is not received, selecting the one of the at least two resource allocations for the respective SRS resource based on a default selection that is preconfigured; and transmitting, to the base station, an SRS on a respective SRS resource of the SRS resource set based on one of the at least two resource allocations for the respective SRS resource, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

2. The method of claim 1, wherein the time resource allocation of each of the at least two resource allocations is configured with one or more of a start position, a number of symbols, or a repetition factor associated with resource mapping of the respective SRS resource.

3. The method of claim 1, wherein the frequency resource allocation of the one of the at least two resource allocations for the respective SRS resource is configured without frequency hopping, and the frequency resource allocation of another of the at least two resource allocations for the respective SRS resource is configured with frequency hopping.

4. The method of claim 3, wherein the frequency resource allocation of each of the at least two resource allocations is further configured with one or more of a frequency domain position or a frequency domain shift associated with resource mapping of the respective SRS resource.

5. The method of claim 1, further comprising:

receiving, from the base station, information configuring selection of the one of the at least two resource allocations, wherein the one of the at least two resource allocations is selected based on the information configuring selection.

6. The method of claim 5, wherein the information configuring selection of the one of the at least two resource allocations comprises a trigger value associated with aperiodic SRS transmission.

7. The method of claim 6, wherein the trigger value has a one-to-one association with the one of the at least two resource allocations for each SRS resource of the SRS resource set.

8. The method of claim 5, wherein the information configuring selection comprises downlink control information (DCI).

9. The method of claim 8, wherein the DCI comprises at least one code point, and the at least one code point indicates the information configuring selection of the one of the at least two resource allocations.

10. The method of claim 9, wherein the at least one code point further triggers the transmitting of the SRS on the respective SRS resource of the SRS resource set.

11. The method of claim 8, wherein the DCI comprises one of DCI scheduling information for the UE, DCI from which the scheduling information is absent, or DCI that is groupcast.

12. The method of claim 11, wherein the DCI from which the scheduling information is absent comprises a set of bit fields associated with scheduling data, and at least one code point indicating the information configuring selection of the one of the at least two resource allocations is included in the set of bit fields associated with scheduling data.

13. The method of claim 11, wherein the DCI scheduling information for the UE comprises at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

14. The method of claim 11, wherein the DCI that is groupcast comprises a block of bits assigned to the UE, and at least one code point indicating the information configuring selection of the one of the at least two resource allocations is included in the block of bits assigned to the UE.

15. The method of claim 8, wherein the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

16. The method of claim 10, wherein the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

17. A method of wireless communication by a base station, comprising:

transmitting, to a user equipment (UE), a sounding reference signal (SRS) configuration indicating at least two resource allocations for each SRS resource of an SRS resource set, each of the at least two resource allocations comprising a time resource allocation and a frequency resource allocation; and receiving, from the UE, an SRS on a respective SRS resource of the SRS resource set based on one of the at least two resource allocations for the respective SRS resource, wherein the one of the two at least two resource allocations for the respective SRS resource is selected based on a default selection that is preconfigured, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

18. The method of claim 17, wherein the time resource allocation of each of the at least two resource allocations comprises one or more of a start position, a number of symbols, or a repetition factor associated with resource mapping of the respective SRS resource.

19. The method of claim 17, wherein the frequency resource allocation of the one of the at least two resource allocations for the respective SRS resource is configured without frequency hopping, and another of the at least two resource allocations for the respective SRS resource is configured with frequency hopping.

20. The method of claim 19, wherein the frequency resource allocation of each of the at least two resource allocations is further configured with one or more of a frequency domain position or a frequency domain shift associated with resource mapping of the respective SRS resource.

21. The method of claim 17, further comprising:
transmitting, to the UE, information configuring selection of the one of the at least two resource allocations,
wherein the SRS is received using the one of the at least two resource allocations based on the information configuring selection.

22. The method of claim 21, wherein the information configuring selection comprises downlink control information (DCI).

23. The method of claim 22, wherein the DCI comprises at least one code point, and the at least one code point indicates the information configuring selection of the one of the at least two resource allocations.

24. The method of claim 23, wherein the at least one code point further triggers the transmitting of the SRS on the respective SRS resource of the SRS resource set, and the SRS resource set is aperiodic.

25. The method of claim 22, wherein the DCI comprises one of DCI scheduling information for the UE, DCI from which the scheduling information is absent, or DCI that is groupcast.

26. The method of claim 25, wherein the DCI from which the scheduling information is absent comprises a set of bit fields associated with scheduling data, and at least one code point indicating the information configuring selection of the one of the at least two resource allocations is included in the set of bit fields associated with scheduling data.

27. The method of claim 25, wherein the DCI scheduling information for the UE comprises at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

28. The method of claim 25, wherein the DCI that is groupcast comprises a block of bits assigned to the UE, and at least one code point indicating the information configuring selection of the one of the at least two resource allocations is included in the block of bits assigned to the UE.

29. The method of claim 22, wherein the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

30. The method of claim 22, wherein the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

31. An apparatus for wireless communication by a user equipment (UE), comprising:

a memory; and
at least one processor coupled to the memory and configured to:
receive, from a base station, a sounding reference signal (SRS) configuration indicating at least two resource allocations for each SRS resource of an SRS resource set, each of the at least two resource allocations comprising a time resource allocation and a frequency resource allocation;
based on a determination that an information configuring selection is not received, select the one of the at least two resource allocations for the respective SRS resource based on a default selection that is preconfigured; and
transmit, to the base station, an SRS on a respective SRS resource of the SRS resource set based on one of the at least two resource allocations for the respective SRS resource,
wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

32. The apparatus of claim 31, wherein the time resource allocation of each of the at least two resource allocations is configured with one or more of a start position, a number of symbols, or a repetition factor associated with resource mapping of the respective SRS resource.

33. The apparatus of claim 31, wherein the frequency resource allocation of the one of the at least two resource allocations for the respective SRS resource is configured without frequency hopping, and the frequency resource allocation of another of the at least two resource allocations for the respective SRS resource is configured with frequency hopping.

34. The apparatus of claim 33, wherein the frequency resource allocation of each of the at least two resource allocations is further configured with one or more of a frequency domain position or a frequency domain shift associated with resource mapping of the respective SRS resource.

35. The apparatus of claim 31, wherein the at least one processor is further configured to:
receive, from the base station, information configuring selection of the one of the at least two resource allocations,
wherein the one of the at least two resource allocations is selected based on the information configuring selection.

36. The apparatus of claim 35, wherein the information configuring selection of the one of the at least two resource allocations comprises a trigger value associated with aperiodic SRS transmission.

37. The apparatus of claim 36, wherein the trigger value has a one-to-one association with the one of the at least two resource allocations for each SRS resource of the SRS resource set.

38. The apparatus of claim 35, wherein the information configuring selection comprises downlink control information (DCI).

39. The apparatus of claim 38, wherein the DCI comprises at least one code point, and the at least one code point indicates the information configuring selection of the one of the at least two resource allocations.

40. The apparatus of claim 39, wherein the at least one code point further triggers the transmission of the SRS on the respective SRS resource of the SRS resource set.

41. The apparatus of claim 38, wherein the DCI comprises one of DCI scheduling information for the UE, DCI from which the scheduling information is absent, or DCI that is groupcast.

42. The apparatus of claim 41, wherein the DCI from which the scheduling information is absent comprises a set of bit fields associated with scheduling data, and at least one code point indicating the information configuring selection of the one of the at least two resource allocations is included in the set of bit fields associated with scheduling data.

43. The apparatus of claim 41, wherein the DCI scheduling information for the UE comprises at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

44. The apparatus of claim 41, wherein the DCI that is groupcast comprises a block of bits assigned to the UE, and at least one code point indicating the information configuring selection of the one of the at least two resource allocations is included in the block of bits assigned to the UE.

45. The apparatus of claim 38, wherein the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

46. The apparatus of claim 40, wherein the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

47. An apparatus for wireless communication by a base station, comprising:
a memory; and
at least one processor coupled to the memory and configured to:
transmit, to a user equipment (UE), a sounding reference signal (SRS) configuration indicating at least two resource allocations for each SRS resource of an SRS resource set, each of the at least two resource allocations comprising a time resource allocation and a frequency resource allocation; and
receive, from the UE, an SRS on a respective SRS resource of the SRS resource set based on one of the at least two resource allocations for the respective SRS resource, wherein the one of the two at least two resource allocations for the respective SRS resource is selected based on a default selection that is pre-configured,
wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

48. The apparatus of claim 47, wherein the time resource allocation of each of the at least two resource allocations comprises one or more of a start position, a number of symbols, or a repetition factor associated with resource mapping of the respective SRS resource.

49. The apparatus of claim 47, wherein the frequency resource allocation of the one of the at least two resource allocations for the respective SRS resource is configured without frequency hopping, and another of the at least two resource allocations for the respective SRS resource is configured with frequency hopping.

50. The apparatus of claim 48, wherein the frequency resource allocation of each of the at least two resource allocations is further configured with one or more of a frequency domain position or a frequency domain shift associated with resource mapping of the respective SRS resource.

51. The apparatus of claim 47, wherein the at least one processor is further configured to:
transmit, to the UE, information configuring selection of the one of the at least two resource allocations,
wherein the SRS is received using the one of the at least two resource allocations based on the information configuring selection.

52. The apparatus of claim 51, wherein the information configuring selection comprises downlink control information (DCI).

53. The apparatus of claim 52, wherein the DCI comprises at least one code point, and the at least one code point indicates the information configuring selection of the one of the at least two resource allocations.

54. The apparatus of claim 53, wherein the at least one code point further triggers the transmission of the SRS on the respective SRS resource of the SRS resource set, and the SRS resource set is aperiodic.

55. The apparatus of claim 52, wherein the DCI comprises one of DCI scheduling information for the UE, DCI from which the scheduling information is absent, or DCI that is groupcast.

56. The apparatus of claim 55, wherein the DCI from which the scheduling information is absent comprises a set of bit fields associated with scheduling data, and at least one code point indicating the information configuring selection of the one of the at least two resource allocations is included in the set of bit fields associated with scheduling data.

57. The apparatus of claim 55, wherein the DCI scheduling information for the UE comprises at least one code point associated with at least one of a time-domain resource allocation or a frequency-domain resource allocation, and at least one code point indicating the information configuring selection of the one of the at least two resource allocations is indicated by the at least one code point associated with the at least one of the time-domain resource allocation or the frequency-domain resource allocation.

58. The apparatus of claim 55, wherein the DCI that is groupcast comprises a block of bits assigned to the UE, and at least one code point indicating the information configuring selection of the one of the at least two resource allocations is included in the block of bits assigned to the UE.

59. The apparatus of claim 52, wherein the information configuring selection of the one of the at least two resource allocations for the respective SRS resource indicates the one of the at least two resource allocations is a default resource allocation when the SRS on the respective SRS resource of the SRS resource set is triggered based on an independent SRS trigger included in the DCI.

60. The apparatus of claim 52, wherein the information configuring selection of the one of the at least two resource allocations for the respective SRS resource indicates the one of the at least two resource allocations is a wideband resource allocation when the SRS on the respective SRS resource of the SRS resource set is jointly triggered based on an aperiodic CSI request included in the DCI.

61. An apparatus for wireless communication by a user equipment (UE), comprising:

means for receiving, from a base station, a sounding reference signal (SRS) configuration indicating at least two resource allocations for each SRS resource of an SRS resource set, each of the at least two resource allocations comprising a time resource allocation and a frequency resource allocation;

means for based on a determination that an information configuring selection is not received, selecting the one of the at least two resource allocations for the respective SRS resource based on a default selection that is preconfigured; and means for transmitting, to the base station, an SRS on a respective SRS resource of the SRS resource set based on one of the at least two resource allocations for the respective SRS resource, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

62. An apparatus for wireless communication by a base station, comprising:

means for transmitting, to a user equipment (UE), a sounding reference signal (SRS) configuration indicating at least two resource allocations for each SRS resource of an SRS resource set, each of the at least two resource allocations comprising a time resource allocation and a frequency resource allocation; and means for receiving, from the UE, an SRS on a respective SRS resource of the SRS resource set based on one of the at least two resource allocations for the respective SRS resource, wherein the one of the two at least two resource allocations for the respective SRS resource is selected based on a default selection that is preconfigured, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

63. A non-transitory computer-readable medium storing computer-executable code for wireless communication by a user equipment (UE), the code when executed by a processor cause the processor to:

receive, from a base station, a sounding reference signal (SRS) configuration indicating at least two resource allocations for each SRS resource of an SRS resource set, each of the at least two resource allocations comprising a time resource allocation and a frequency resource allocation;

based on a determination that an information configuring selection is not received, select the one of the at least two resource allocations for the respective SRS resource based on a default selection that is preconfigured; and transmit, to the base station, an SRS on a respective SRS resource of the SRS resource set based on one of the at least two resource allocations for the respective SRS resource, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

64. A non-transitory computer-readable medium storing computer-executable code for wireless communication by a base station, the code when executed by a processor cause the processor to:

transmit, to a user equipment (UE), a sounding reference signal (SRS) configuration indicating at least two resource allocations for each SRS resource of an SRS resource set, each of the at least two resource allocations comprising a time resource allocation and a frequency resource allocation; and receive, from the UE, an SRS on a respective SRS resource of the SRS resource set based on one of the at least two resource allocations for the respective SRS resource, wherein the one of the two at least two resource allocations for the respective SRS resource is selected based on a default selection that is preconfigured, wherein the frequency resource allocation of the one of the at least two resource allocations for the respective SRS resource is configured with a first transmission comb value, and the frequency resource allocation of another of the at least two resource allocations for the respective SRS resource is configured with a second transmission comb value.

* * * * *